US008874257B2

(12) United States Patent
Sinram et al.

(10) Patent No.: US 8,874,257 B2
(45) Date of Patent: Oct. 28, 2014

(54) SYSTEM AND METHOD FOR IDENTIFYING AND SORTING MATERIAL

(71) Applicant: 6511660 Canada Inc., Sherbrooke (CA)

(72) Inventors: Bryan W. Sinram, Port Jefferson, NY (US); Ian Levasseur, Sherbrooke (CA); Nathanael Lortie, Sherbrooke (CA)

(73) Assignee: 6511660 Canada Inc., Sherbrooke, Quebec (CA)

( * ) Notice: Subject to any disclaimer, the term of this patent is extended or adjusted under 35 U.S.C. 154(b) by 0 days.

(21) Appl. No.: 13/787,339

(22) Filed: Mar. 6, 2013

(65) Prior Publication Data

US 2013/0253698 A1 Sep. 26, 2013

Related U.S. Application Data

(63) Continuation of application No. 12/295,699, filed as application No. PCT/CA2007/000573 on Apr. 4, 2007, now Pat. No. 8,421,856.

(60) Provisional application No. 60/788,710, filed on Apr. 4, 2006.

(51) Int. Cl.
*H04N 7/18* (2006.01)

(52) U.S. Cl.
USPC ........... 700/223; 209/576; 209/930; 209/672; 209/667; 209/580

(58) Field of Classification Search
USPC ........................................................ 700/223
See application file for complete search history.

(56) References Cited

U.S. PATENT DOCUMENTS

| | | | |
|---|---|---|---|
| 5,353,937 | A | 10/1994 | Childress |
| 5,448,363 | A | 9/1995 | Hager |
| 5,450,966 | A | 9/1995 | Clark et al. |
| 5,471,311 | A | 11/1995 | Van den Bergh et al. |
| 5,484,247 | A | 1/1996 | Clark et al. |

(Continued)

FOREIGN PATENT DOCUMENTS

| | | |
|---|---|---|
| CA | 2199021 | 8/1999 |
| CA | 2224918 | 8/2001 |

(Continued)

OTHER PUBLICATIONS

Extended European Search Report for corresponding European Patent Application No. 07719503 mailed Nov. 8, 2011.

*Primary Examiner* — Gene Crawford
*Assistant Examiner* — Kyle Logan
(74) *Attorney, Agent, or Firm* — Merchant & Gould P.C.

(57) ABSTRACT

An automatic sorting system identifying and sorting non-homogenous material includes a conveyor belt and an identification unit above the conveying surface for identifying material. The identification unit includes a projector projecting light downwardly onto material to be identified, which reflects light towards the identification unit. The identification unit includes a lens receiving the reflected light from the material, and a first processing unit linked to the lens for spectral analysis of reflected light captured by the lens to determine the nature of the material, and a second processing unit linked to the first processing unit for comparing spectral analysis results with data associated with different materials stored in a second processing unit database. A sorting unit links to the second processing unit and cooperates with the second end of the conveyor to sort material released from the second end depending on signals from the second processing unit.

31 Claims, 27 Drawing Sheets

(56) References Cited

U.S. PATENT DOCUMENTS

| | | | |
|---|---|---|---|
| 5,485,925 A | 1/1996 | Miller et al. | |
| 5,497,887 A | 3/1996 | Hiebert | |
| 5,499,488 A | 3/1996 | Green et al. | |
| 5,508,512 A | 4/1996 | Gray et al. | |
| 5,509,537 A | 4/1996 | Crimson et al. | |
| 5,526,437 A | 6/1996 | West | |
| 5,529,169 A | 6/1996 | Wilbur et al. | |
| 5,562,214 A | 10/1996 | Castaneda et al. | |
| 5,579,921 A | 12/1996 | Mallant et al. | |
| 5,586,663 A | 12/1996 | Graudejus et al. | |
| 5,631,460 A | 5/1997 | Gray et al. | |
| 5,675,416 A | 10/1997 | Campbell et al. | |
| 5,676,256 A * | 10/1997 | Kumar et al. | 209/580 |
| 5,703,784 A | 12/1997 | Pearson | |
| 5,799,801 A | 9/1998 | Clark et al. | |
| 5,862,919 A | 1/1999 | Eason | |
| 5,887,073 A | 3/1999 | Fazzari et al. | |
| 5,960,964 A | 10/1999 | Austin et al. | |
| 6,064,056 A | 5/2000 | Doak | |
| 6,137,074 A | 10/2000 | Doak | |
| 6,144,004 A | 11/2000 | Doak | |
| 6,149,018 A | 11/2000 | Austin et al. | |
| 6,191,859 B1 | 2/2001 | Winterbottom et al. | |
| 6,265,684 B1 | 7/2001 | Wu | |
| 6,303,952 B1 | 10/2001 | Aoki et al. | |
| 6,371,305 B1 * | 4/2002 | Austin et al. | 209/672 |
| 6,380,503 B1 | 4/2002 | Mills et al. | |
| 6,460,788 B1 | 10/2002 | de Feraudy | |
| 6,504,124 B1 | 1/2003 | Doak | |
| 6,726,028 B2 | 4/2004 | Visscher et al. | |
| 6,787,724 B2 | 9/2004 | Bennett et al. | |
| 7,893,378 B2 * | 2/2011 | Kenny | 209/576 |
| 7,994,448 B2 | 8/2011 | Kenny | |
| 2003/0132142 A1 | 7/2003 | Kumar | |
| 2004/0095571 A1 | 5/2004 | Bourely et al. | |

FOREIGN PATENT DOCUMENTS

| | | |
|---|---|---|
| DE | 44 19 461 A1 | 12/1995 |
| DE | 69721199.1 | 10/2003 |
| EP | 1 243 350 A1 | 9/2002 |
| EP | 0 849 006 B1 | 4/2003 |
| EP | 1 698 888 A2 | 9/2006 |
| WO | WO 00/70331 A1 | 11/2000 |

* cited by examiner 101
111
113
125

SYSTEM AND METHOD FOR IDENTIFYING AND SORTING MATERIAL

This application is a Continuation of U.S. Ser. No. 12/295,699, filed 14 Jan. 2009, which is a National Stage Application of PCT/CA2007/000573, filed 4 Apr. 2007, which claims benefit of U.S. Ser. No. 60/788,710, filed 4 Apr. 2006 and which applications are incorporated herein by reference. To the extent appropriate, a claim of priority is made to each of the above disclosed applications.

FIELD OF THE INVENTION

The present invention relates to a system and method for identifying and sorting material. More particularly, and in its preferred intended use, the present invention relates to a system and method for identifying and sorting material, which also enables "learning" or "teaching" capabilities for the identification of new materials.

BACKGROUND OF THE INVENTION

Apparatuses and methods for sorting recycled material and the like are very well known in the art.

U.S. Pat. No. 5,862,919 granted on Jan. 26, 1999 to EASON relates to a high throughput sorting system. The sorting system provides a high degree of sorting accuracy even in high throughput sorting applications such as high speed wood chip sorting. In one embodiment, a sorting apparatus includes a shaker for distributing stock material, a spectrographic analyzer for identifying unacceptable material in a product stream, an ejector for diverting unacceptable material from the product stream, a three-zone sorting receptacle and a recirculating system for returning a selected portion of the sorter output for an additional pass by the analyzer and ejector. The three-zone sorting receptacle divides the product stream into an accept portion, a rejection portion, and an ambiguous portion including both acceptable product and unacceptable material. The ambiguous portion is re-sorted for improved accuracy at high throughput levels.

Also known to the Applicant are the following US patents which describe other apparatuses and machines for sorting material whether mechanically, optically or other: U.S. Pat. No. 5,353,937; U.S. Pat. No. 5,448,363; U.S. Pat. No. 5,450,966; U.S. Pat. No. 5,471,311; U.S. Pat. No. 5,484,247; U.S. Pat. No. 5,485,925; U.S. Pat. No. 5,497,887; U.S. Pat. No. 5,499,488; U.S. Pat. No. 5,508,512; U.S. Pat. No. 5,509,537; U.S. Pat. No. 5,526,437; U.S. Pat. No. 5,562,214; U.S. Pat. No. 5,579,921; U.S. Pat. No. 5,586,663; U.S. Pat. No. 5,631,460; U.S. Pat. No. 5,799,801; U.S. Pat. No. 5,887,073; U.S. Pat. No. 5,960,964; U.S. Pat. No. 6,064,056; U.S. Pat. No. 6,137,074; U.S. Pat. No. 6,144,004; U.S. Pat. No. 6,149,018; U.S. Pat. No. 6,265,684 B1; U.S. Pat. No. 6,303,952 B1; U.S. Pat. No. 6,371,305 B1; U.S. Pat. No. 6,380,503 B1; U.S. Pat. No. 6,460,788 B1; U.S. Pat. No. 6,504,124 B1; U.S. Pat. No. 6,726,028 B2; and U.S. Pat. No. 6,787,724 B2.

Also known to the Applicant are the following foreign patents and/or patent applications which also describe other apparatuses and machines for sorting material: Belgium 0849006; Germany 69721199.1; Spain 0849006; Finland 0849006; France 0849006; United Kingdom 0849006; Netherlands 0849006; Sweden 0849006; Canada 2,199,021; and Canada 2,224,918.

However, a substantial drawback associated with several of the above-mentioned apparatuses is that they do not enable to specifically identify materials going through a product stream, and to sort them accordingly, in a precise manner, and at a high output rate. For example, the system described in U.S. Pat. No. 5,862,919 is used essentially to sort materials into "acceptable" and "non-acceptable" products, rather than enabling a manner to specifically and precisely identify the nature of the materials being sorted. Furthermore, it is also known in the art that in regards to systems used for sorting materials, it is preferable to have a design that enables a variety of configurations so as to carry out various different types of sorting applications, while enabling to reduce assembling, operating, maintenance and/or repair costs associated with the operation of the system, while not necessarily affecting the overall sorting capability thereof. Moreover, it is also known in the art that actual related machines on the market work with the inside of a specific wave length, and with a specific and limited library. Therefore, it would be useful to provided a machine that could work simultaneously or not, and thus with a multitude of products, or a related application which could rely or not on the use of wave lengths being completely different. Furthermore, it would be useful to have a system that could identify clear and/or colored materials just with the analysis of the system, and/or the intensity thereof, independently, to the material HDPE clear or colored, PET clear or colored, etc.

Hence, in light of the aforementioned, there is a need for an improved system, which by virtue of its design and components, would be able to overcome some of the above-discussed prior art problems.

SUMMARY OF THE INVENTION

The object of the present invention is to provide a system which, by virtue of its design and components, satisfies some of the above-mentioned needs and is thus an improvement over other related sorting systems and/or methods known in the prior art.

In accordance with the present invention, the above object is achieved, as will be easily understood, with a system such as the one briefly described herein and such as the one exemplified in the accompanying drawings.

More particularly, according to the present invention, there is provided an automatic sorting system for identifying and sorting non-homogenous material, the system comprising:

a conveyor belt having a conveying surface traveling along a longitudinal direction for conveying bulk material to be identified and sorted, the conveyor belt having a first end for receiving said bulk material and a second end for releasing sorted material;

an identification unit cooperable with the conveyor belt and placed above the conveying surface thereof for identifying material traveling therealong, the identification unit comprising:

- at least one projector for projecting a beam of light downwardly towards the conveying surface, at a given height above said conveying surface, and onto a given material to be identified, so that a portion of projected light may be reflected back from said given material and upwardly towards the identification unit;
- at least one lens positioned about the identification unit for receiving said portion of reflected light from the given material to be identified;
- a first processing unit operatively linked to the at least one lens for carrying a spectral analysis of the portion of reflected light captured by the at least one lens so as to determine the nature of the given material; and
- a second processing unit operatively linked to the first processing unit for comparing results of said spectral analysis with corresponding data associated to a variety of different materials stored in a given database of the second processing unit; and a sorting unit operatively linked to the second processing unit and operatively cooperating with the second end of the conveyor so as to sort material released from said second end of the conveyor depending on signals received from the second processing unit.

According to yet another aspect of the present invention, there is also provided a method for operating the above-mentioned system.

According to yet another aspect of the present invention, there is also provided a method of identifying at least one material with the above-mentioned system and/or method.

According to yet another aspect of the present invention, there is also provided a kit for assembling the above-mentioned system.

According to yet another aspect of the present invention, there is also provided a method for assembling components of the above-mentioned kit.

According to yet another aspect of the present invention, there is also provided a method of manufacturing the above-mentioned system.

According to yet another aspect of the present invention, there is also provided at least one material having been sorted with the above-mentioned system and/or method.

According to yet another aspect of the present invention, there is also provided at least one material having been identified with the above-mentioned system and/or method.

The objects, advantages and other features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

Figure 1:
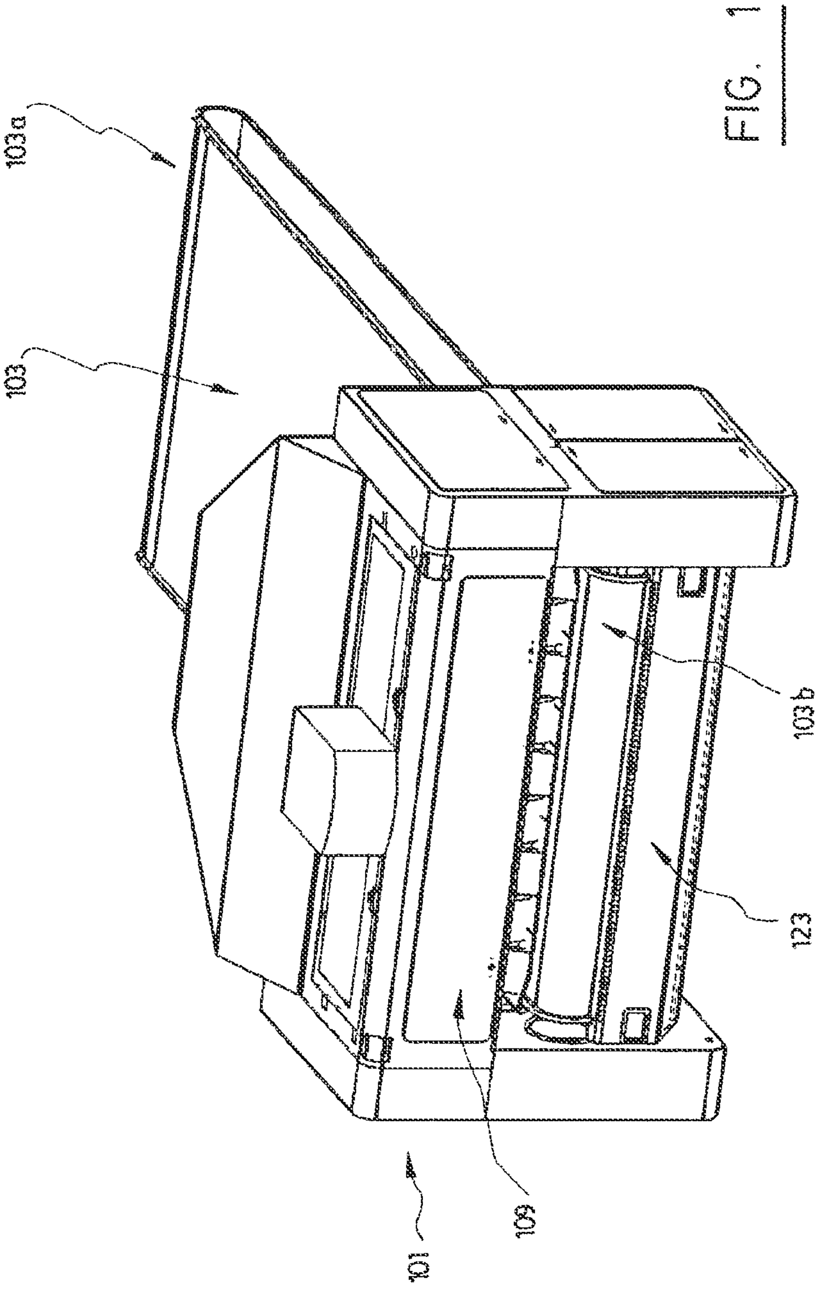
FIG. 1 is a perspective view of a system according to a preferred embodiment of the present invention.

In the following description, the same numerical references refer to similar elements. The embodiments, dimensions, components and/or geometrical configurations shown in the figures are preferred, for exemplification purposes only.

In the context of the present description, the expression "system" or "screen" includes all types of screening, sorting, separating and/or identifying devices, and the like. Moreover, although the present invention was primarily designed for sorting and/or identifying virgin and/or colored material, and the like, it may be used with other kinds of items, or for other usages requiring sorting of different materials, as apparent to a person skilled in the art. For this reason, the expressions "virgin", "colored", "clear", "recycled", "material", "paper", etc. should not be taken as to limit the scope of the present invention and include all other kinds of usages or items with which the present invention may be used and could be useful.

Moreover, in the context of the present description, the expressions "system", "screen", "screener", "arrangement", "device", "assembly", "apparatus", "equipment" and "unit", as well as any other equivalent expressions and/or compound words thereof, may be used interchangeably. The same applies for any other mutually equivalent expressions, such as "screening", "sorting", "separating", "recycling" and "identifying", for example, as well as "database" and "library", as well "spectral" and "spectrographic", as apparent to a person skilled in the art.

In addition, although the preferred embodiments of the present invention as illustrated in the accompanying drawings comprise various components, and although the preferred embodiments of the identifying/sorting system 101 and corresponding parts of the present invention as shown consist of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the sorting system 101 according to the present invention, as will be briefly explained herein and as can be easily inferred herefrom by a person skilled in the art, without departing from the scope of the invention.

More particularly, according to the present invention, and as exemplified in the accompanying drawings, there is provided an automatic sorting system 101 for identifying and sorting non-homogenous material. The system 101 comprises a conveyor belt 103 having a conveying surface 105 traveling along a longitudinal direction 107 for conveying bulk material to be identified and sorted, the conveyor belt 103 having a first end 103*a* for receiving said bulk material and a second end 103*b* for releasing sorted material.

The system 101 also comprises an identification unit 109 cooperable with the conveyor belt 103 and placed above the conveying surface 105 thereof for identifying material traveling therealong. The identification unit 109 comprises at least one projector 111 for projecting a beam of light 113 downwardly towards the conveying surface 105, at a given height 115 above said conveying surface 105, and onto a given material to be identified, so that a portion of projected light may be reflected back from said given material and upwardly towards the identification unit 109. The identification unit 109 also comprises at least one lens 117 positioned about the identification unit 109 for receiving said portion of reflected light from the given material to be identified. The identification unit 109 also comprises a first processing unit 119 operatively linked to the at least one lens 117 for carrying a spectral or spectrographic analysis of the portion of reflected light captured by the at least one lens 117 so as to determine the nature of the given material. The identification unit 109 also comprises a second processing unit 121 operatively linked to the first processing unit 119 for comparing results of said spectral analysis with corresponding data associated to a variety of different materials stored in a given database of the second processing unit 121.

The present system 101 also comprises a sorting unit 123 operatively linked to the second processing unit 121 and operatively cooperating with the second end 103*b* of the conveyor belt 103 so as to sort material released from said second end 103*b* of the conveyor belt 103 depending on signals received from the second processing unit 121.

As will be explained in greater detail hereinbelow, the identification unit 9 is preferably configured to take continuous readings in the spectral resolution of the Near Infra Red (NIR).

Figure 2:
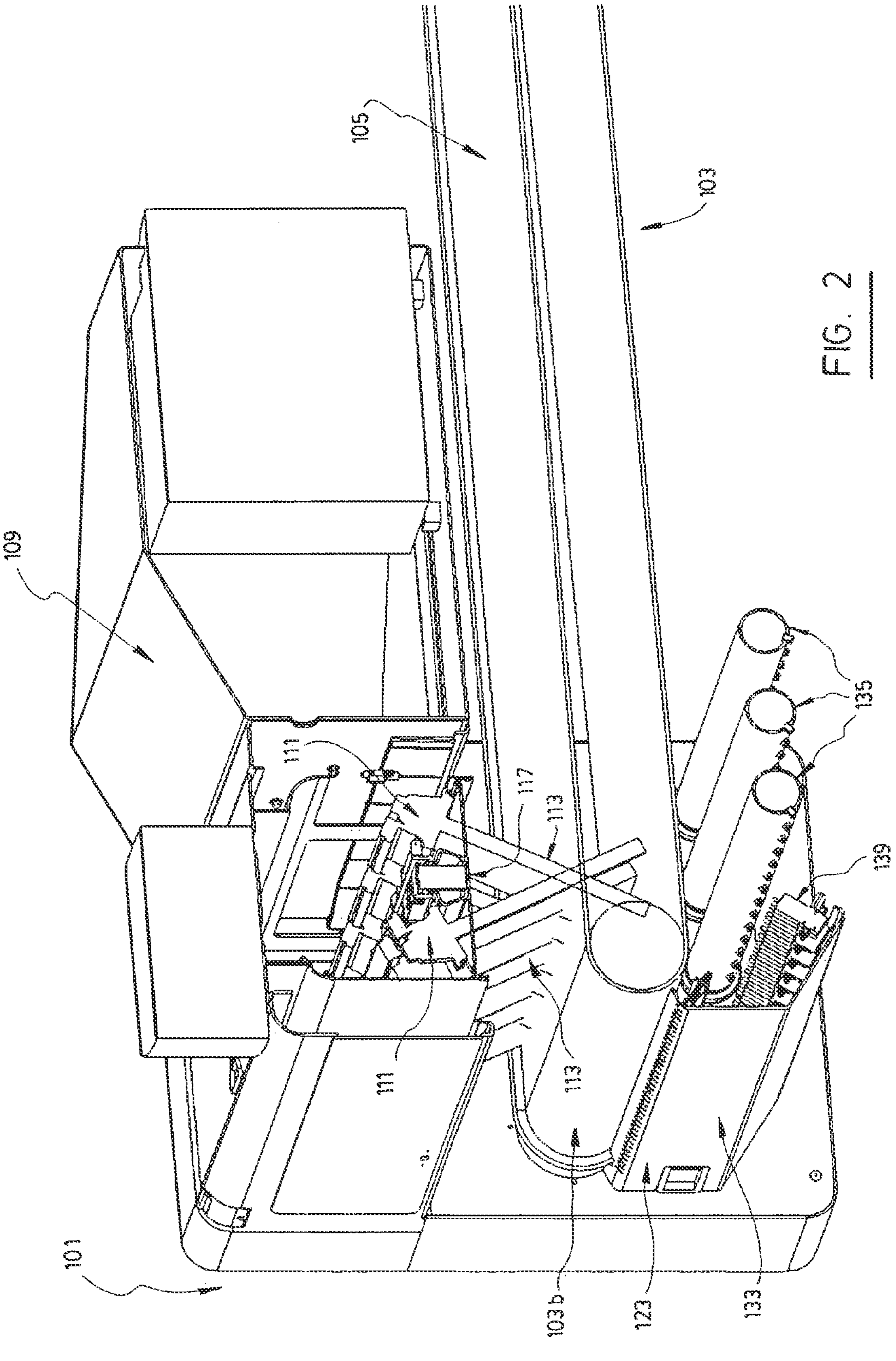
FIG. 2 is a sectional perspective view of a portion of what is shown in FIG. 1, some portions of the system having been removed to as to better illustrate the compartment of the sorting unit being shown in a closed configuration.
Figure 3:
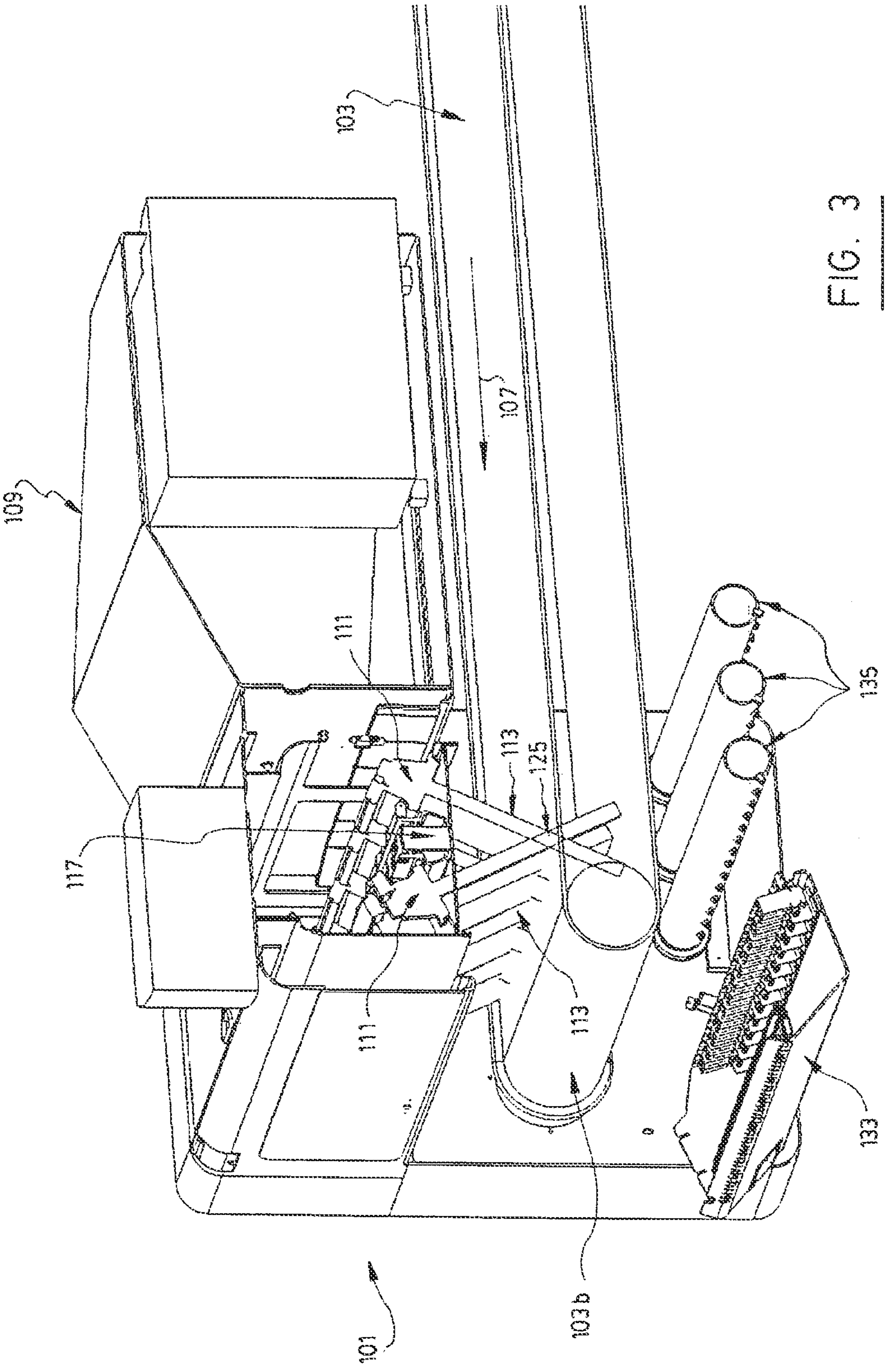
FIG. 3 is another sectional perspective view of what is shown in FIG. 2, the compartment being now shown in an opened configuration.
Figure 4:
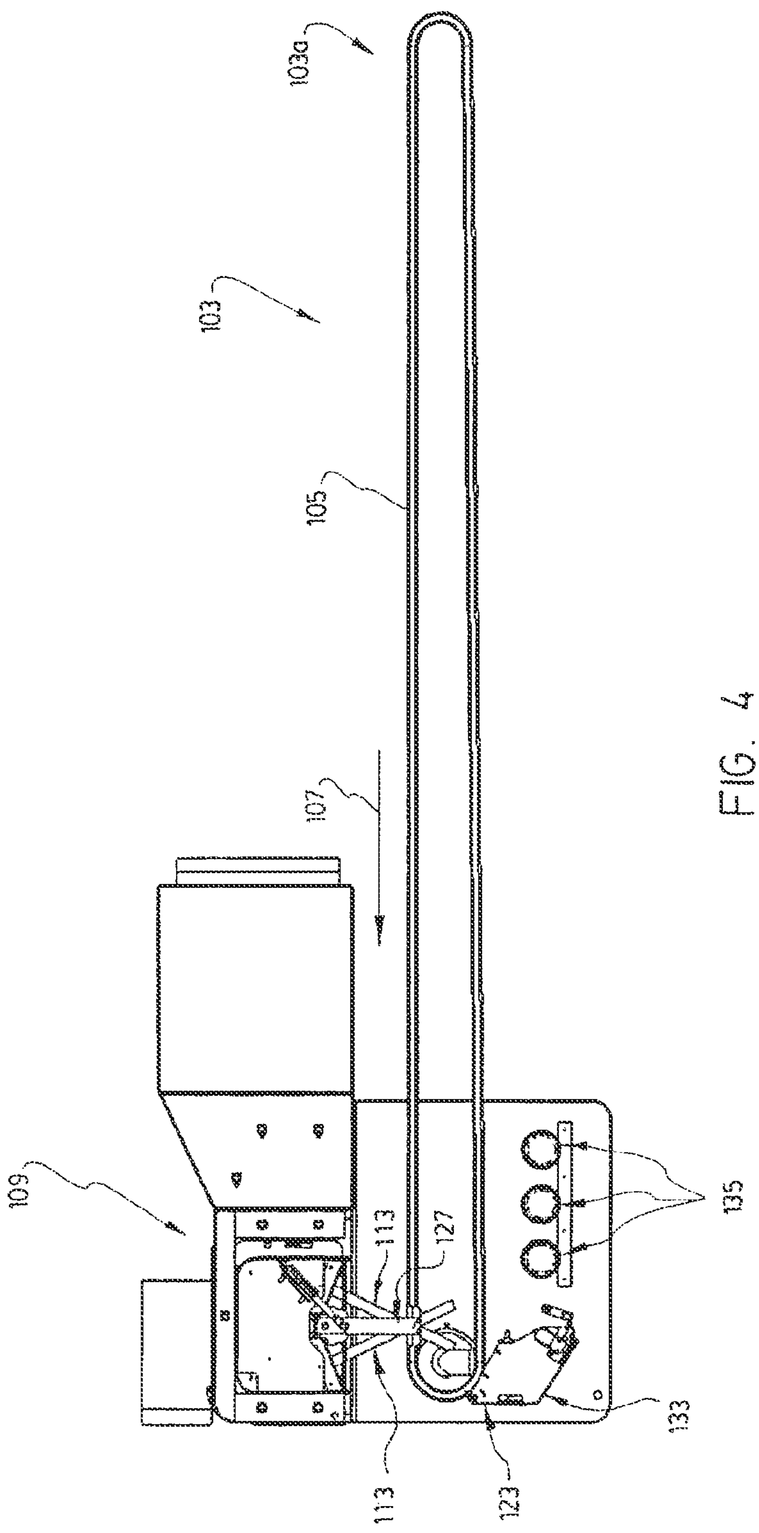
FIG. 4 is a schematic elevational representation of what is shown in FIG. 1.

Preferably, and as better shown in FIGS. 2 and 3, the at least one projector 111 comprises first and second rows of projectors 111, each row of projectors 111 extending substantially in a traverse relationship with respect to the longitudinal direction 107 of the conveyor belt 103, the first row of projectors 111 projecting a series of light beams 113 intersecting with a series of light beams 113 projected from the second row of projectors 111 so define an intersecting area 125 of light at a given height 115 above the conveying surface 105 of the conveyor belt 103, and onto a given material to be identified traveling along said conveyor belt 103, so that a portion of reflected light from the intersecting area 125 of light may be reflected back from said given material and upwardly towards the identification unit 109.

Preferably, and as can be easily understood when referring to FIGS. 6-10, the rows of projectors 111 are adjustable in angle with respect to the identification unit 109 so that the intersecting area 125 of light may be adjustable in terms of height 115 with respect to the conveying surface 105 of the conveyor belt 103. Preferably also, the at least one lens 117 comprise a row of lenses 111 provided between the first and second rows of projectors 111.

Figure 12:
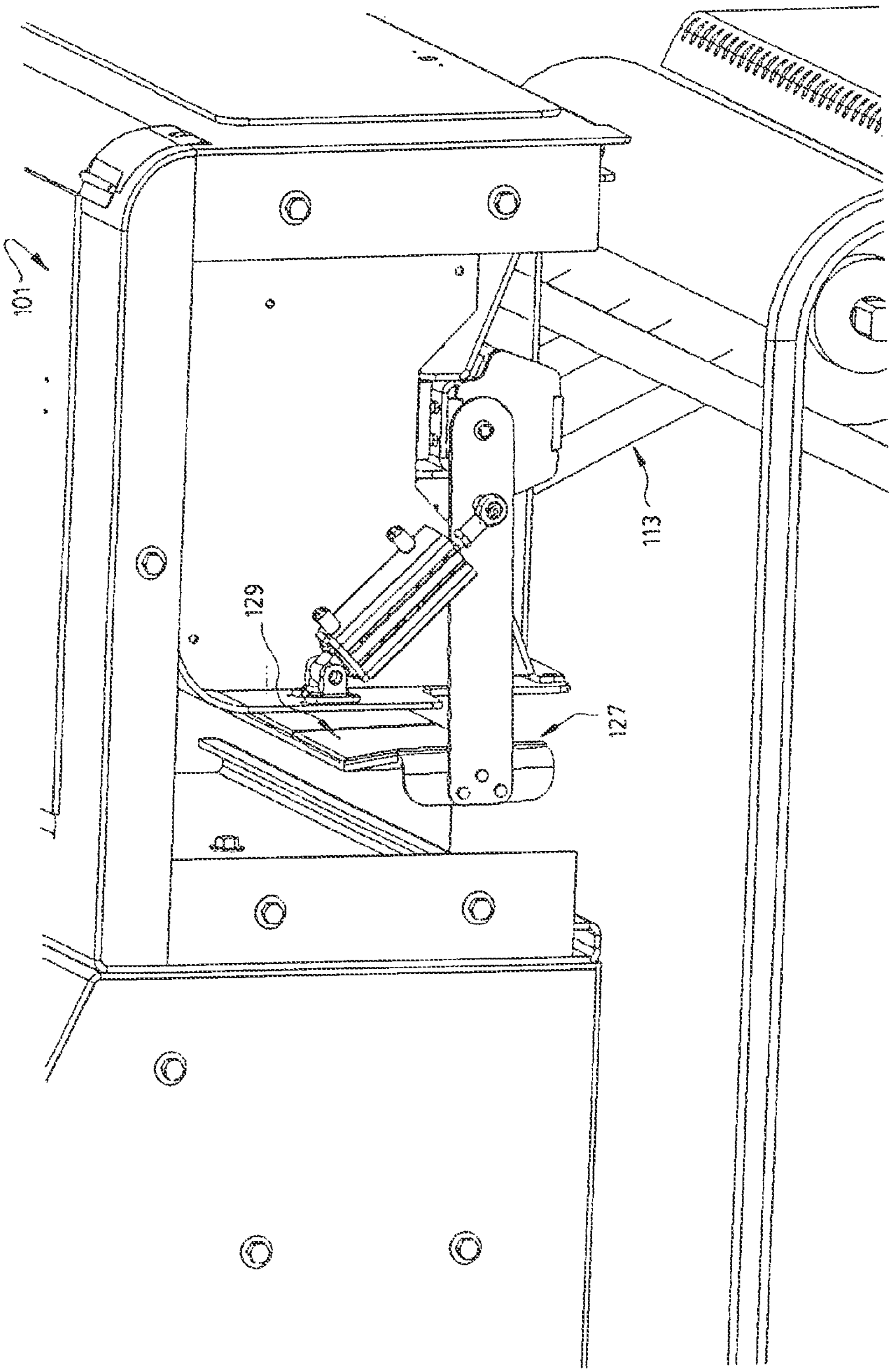
FIG. 12 is an enlarged view of a portion of what is shown in FIG. 11, the system being now shown with one of its panels being removed so as to better illustrate the light beams projected by the projectors and the corresponding calibration device to be used therewith, said calibration device being shown in a retracted configuration.
Figure 13:
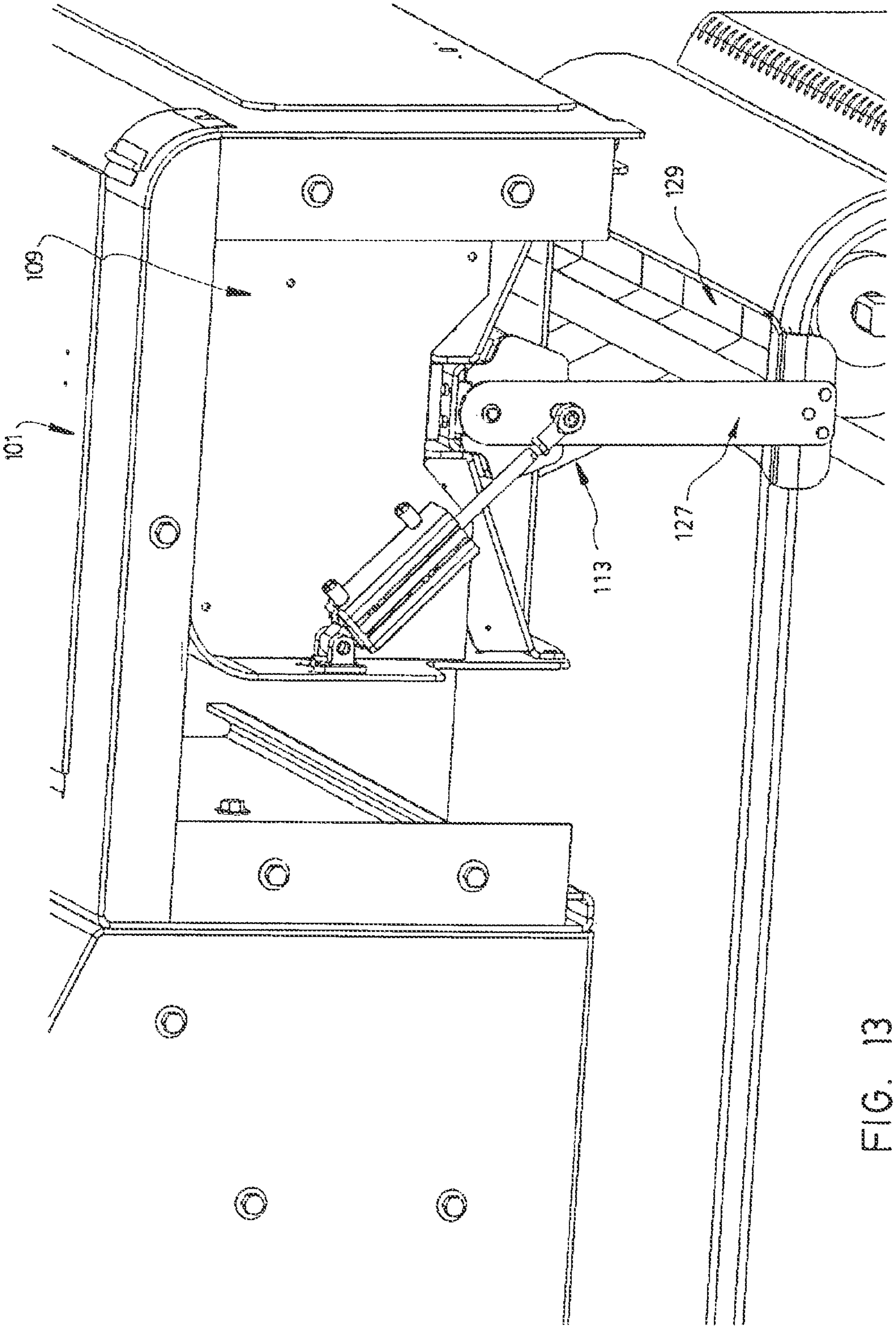
FIG. 13 is another view of what is shown in FIG. 12, the calibration device being now shown in a working configuration.
Figure 14:
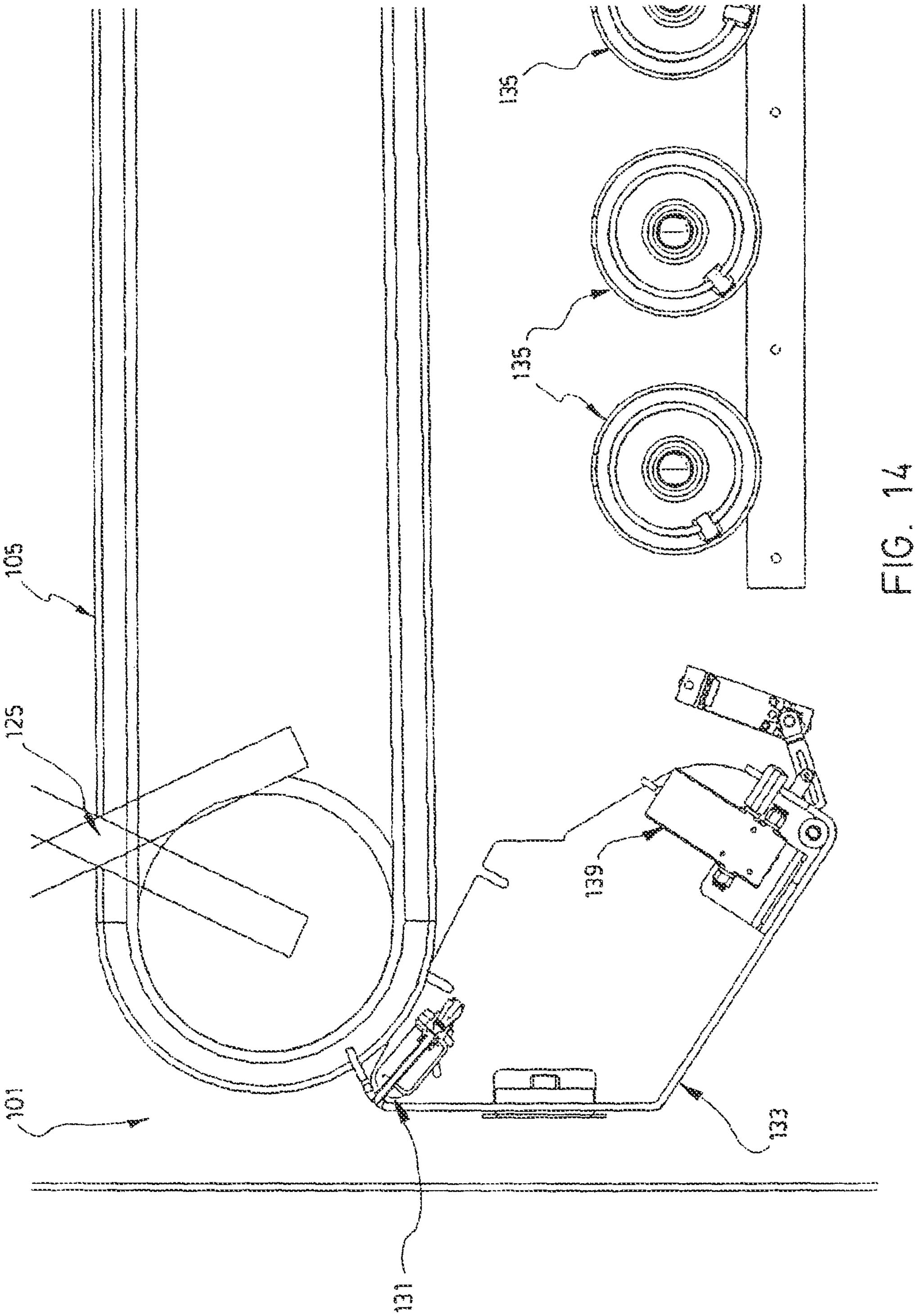
FIG. 14 is an enlarged view of a bottom portion of the system better illustrating the rear end of the conveyor, and corresponding sorting unit provided with at least one source of pressurized air.
Figure 15:
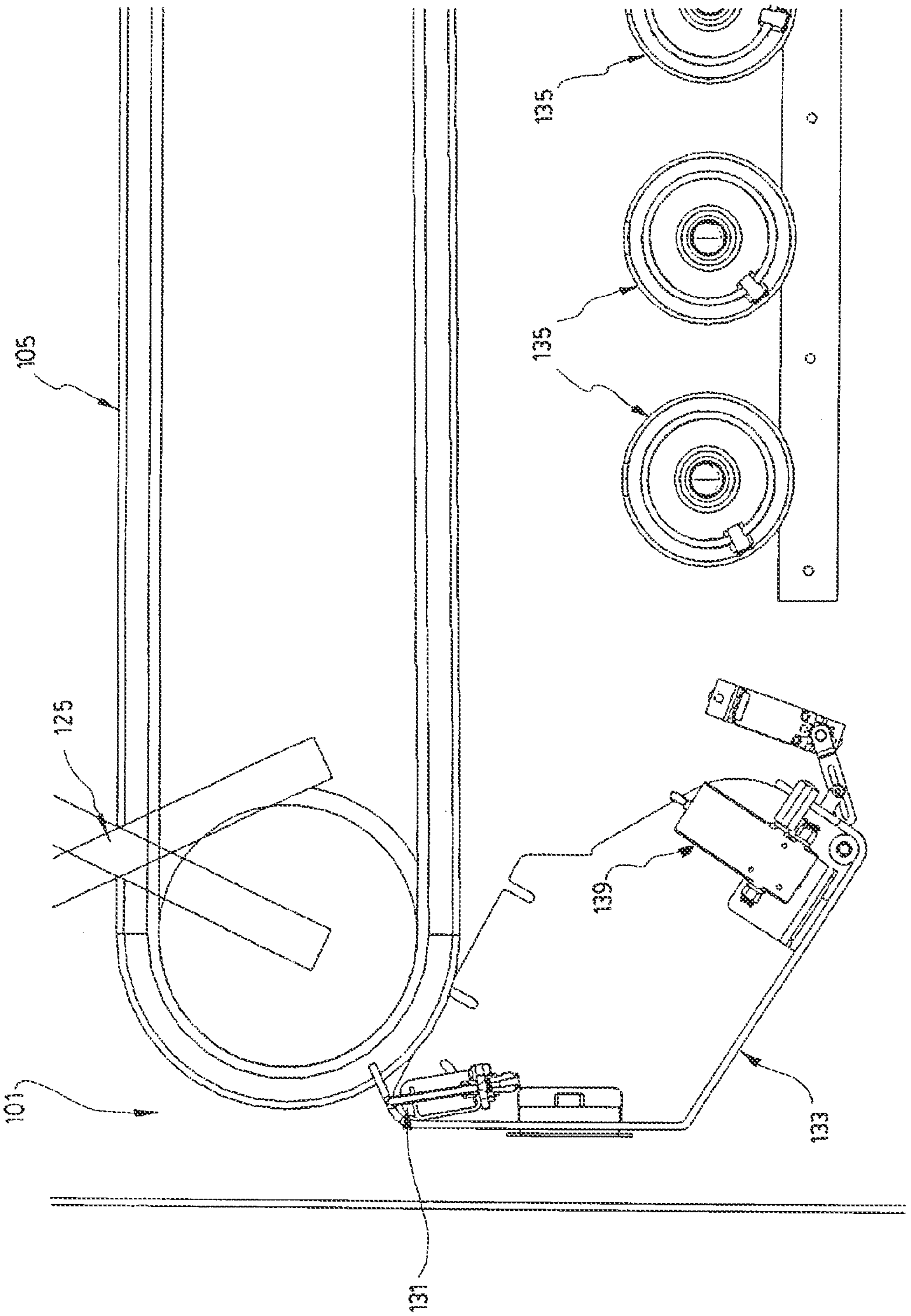
FIG. 15 is another view similar to what is shown in FIG. 14.
Figure 16:
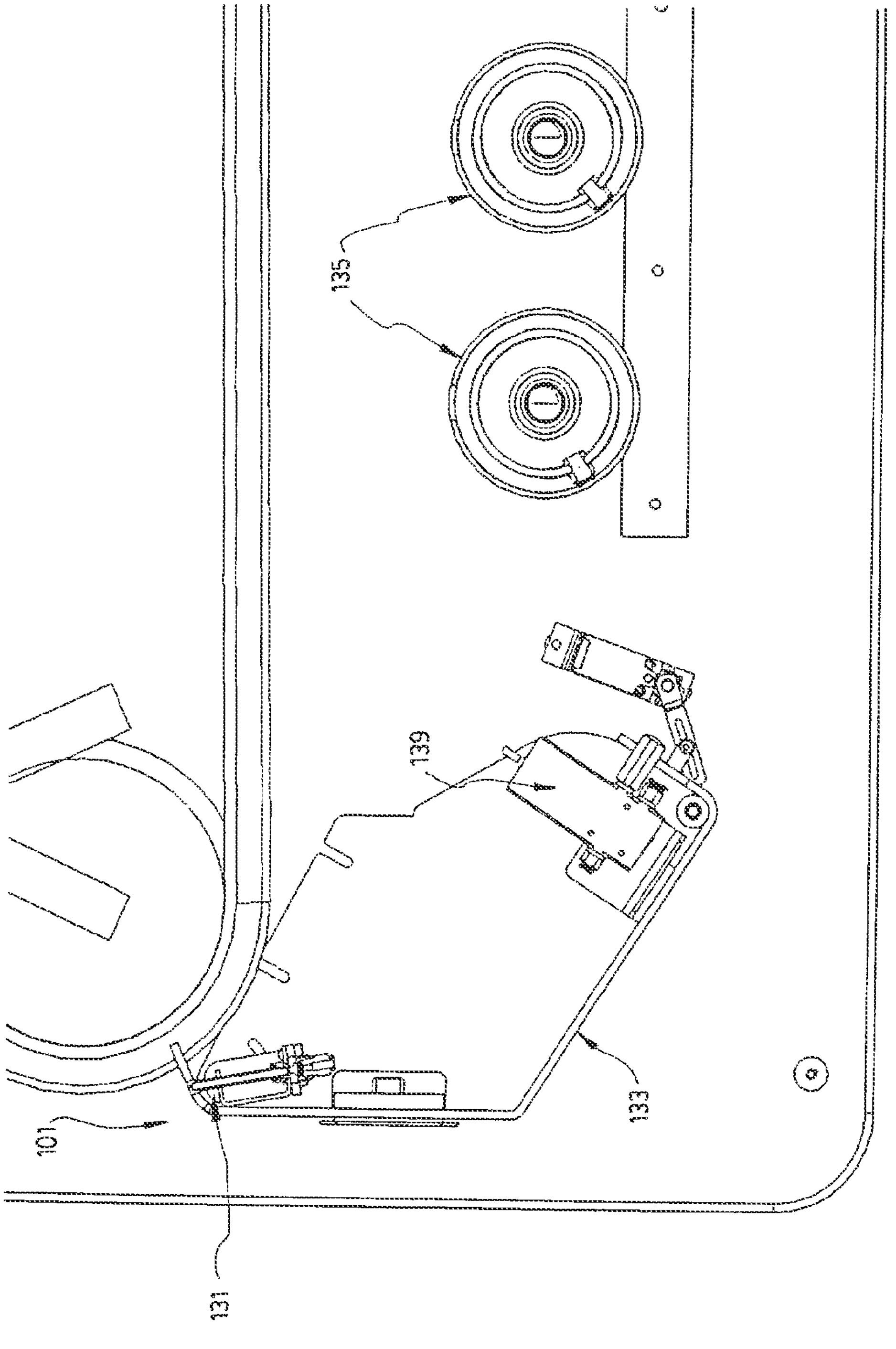
FIG. 16 is an enlarged view of a portion of what is shown in FIG. 15, the compartment of the sorting unit being shown in a closed configuration.
Figure 17:
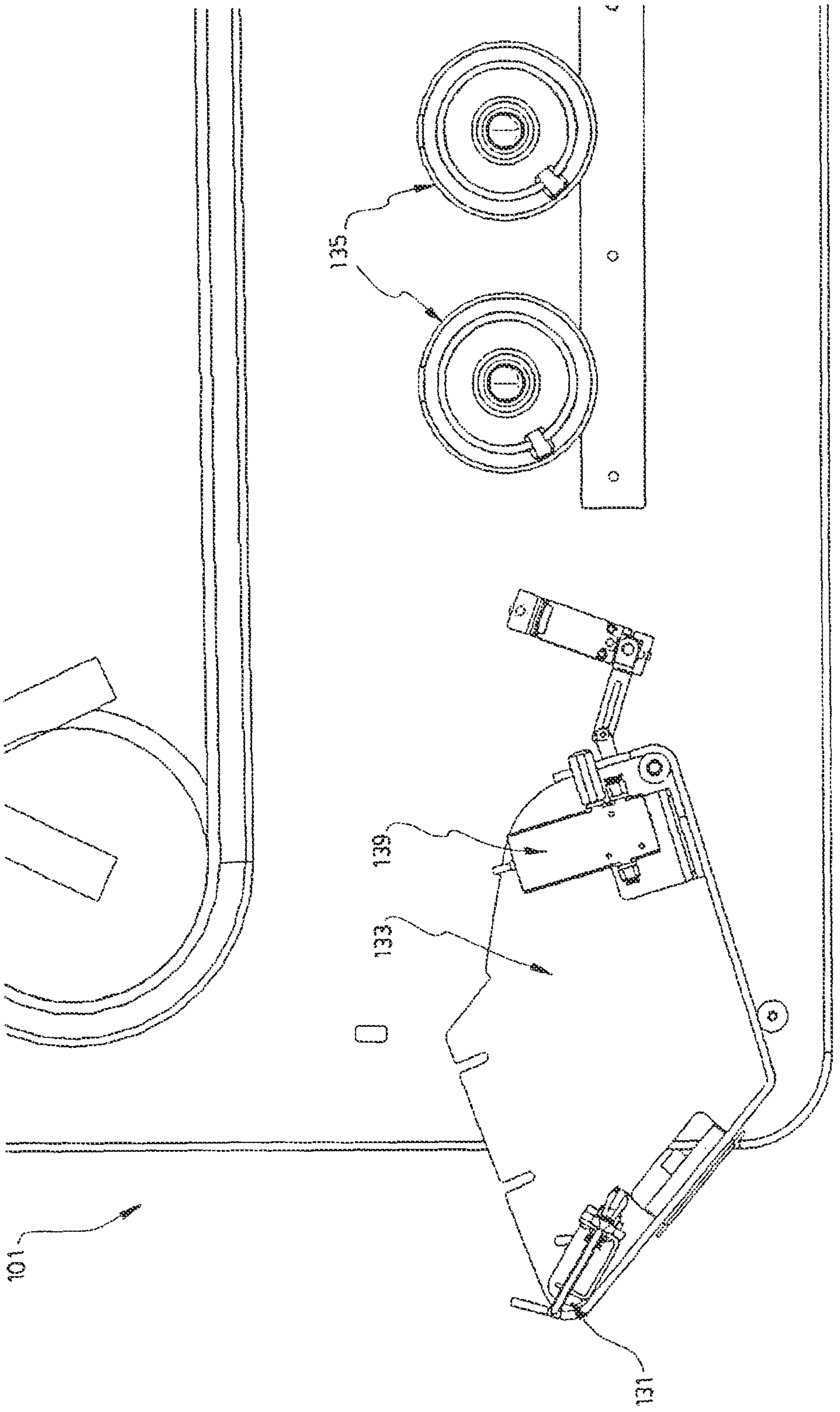
FIG. 17 is another view of what is shown in FIG. 16, the compartment being now shown in an opened configuration.

As better shown in FIGS. 12 and 13, the identification unit 100 preferably comprises a calibration device 127 having a calibrating surface 129 removably positionable below the at one projector 111, and more particularly, about the intersecting area 125 of light when positioned close to the conveying surface 105, so that a portion of reflected light may be reflected back from the calibration surface 129 and upwardly towards the at least one lens 117 so as to calibrate the identification unit 109, in a manner well known in the art. Preferably also, the present system 101 is configured via appropriate hardware and software so that calibration is done automatically and periodically. Preferably also, the calibration surface 129 comprises white ceramics, as better shown in FIG. 13.

According to a preferred embodiment of the present invention, the sorting unit 123 comprises at least one air jet 131 for propelling pressurized air onto given material identified by the identification unit 109 and released from the second end 103*b* of the conveyor belt 103 so as to redirect said given material into a corresponding receiving device configured for received said sorted given material. Preferably also, the at one air jet 131 comprises a series of air jets 131 extending along the sorting unit 123, substantially in a traverse relationship with respect to the longitudinal direction 107 of the conveyor belt 103, as better shown in FIGS. 1-3 and 18. Preferably also, the air jets 131 are adjustable in angle with respect to the sorting unit, as illustrated and as can be easily understood by a person skilled in the art when referring to FIGS. 14-18.

As also shown, the sorting unit 123 preferably comprises a compartment 133 being operable between open and closed configurations, the air jets 131 being removably mounted onto said compartment 133. Preferably also, the sorting unit 123 comprises at least one source 135 of pressurized air for feeding the air jets 131 with corresponding tubes.

Figure 18:
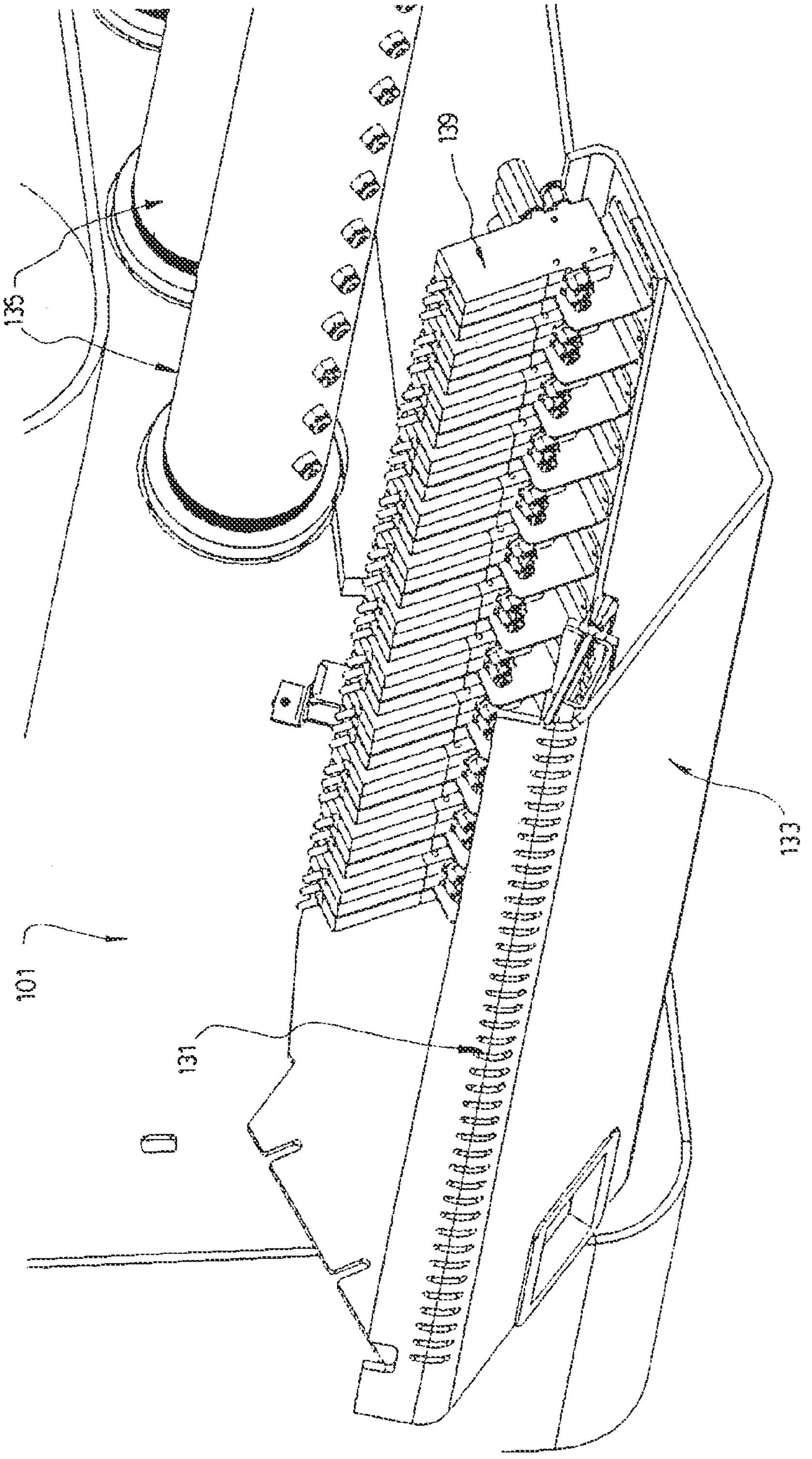
FIG. 18 is a partial perspective view of the compartment of the sorting unit provided with air jets, valves and sources of pressurized air.
Figure 19:
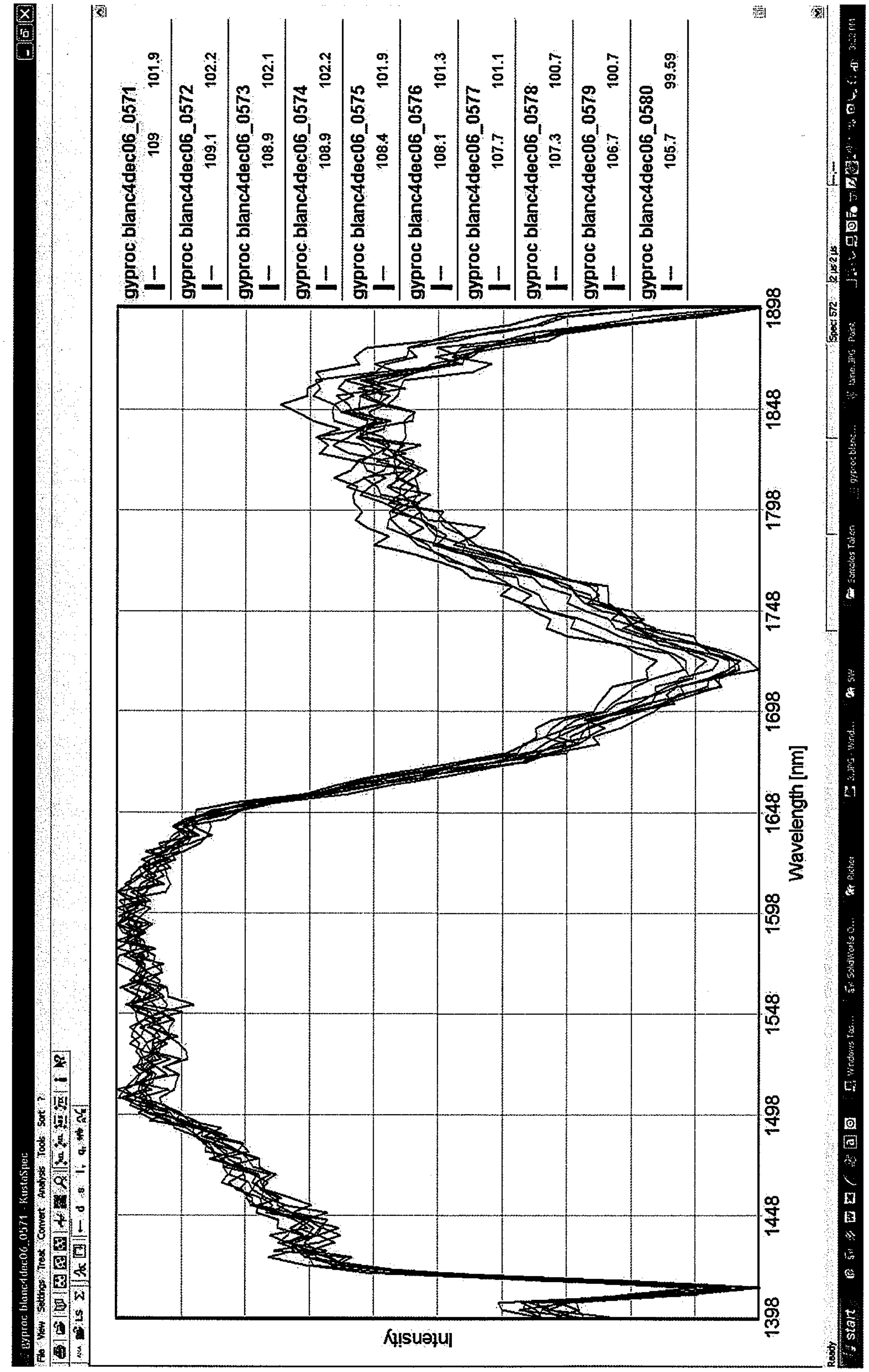
FIG. 19 is a graph of material being identified as gypsum according to a spectral analysis carried out according to a preferred embodiment of the present invention.
Figure 20:
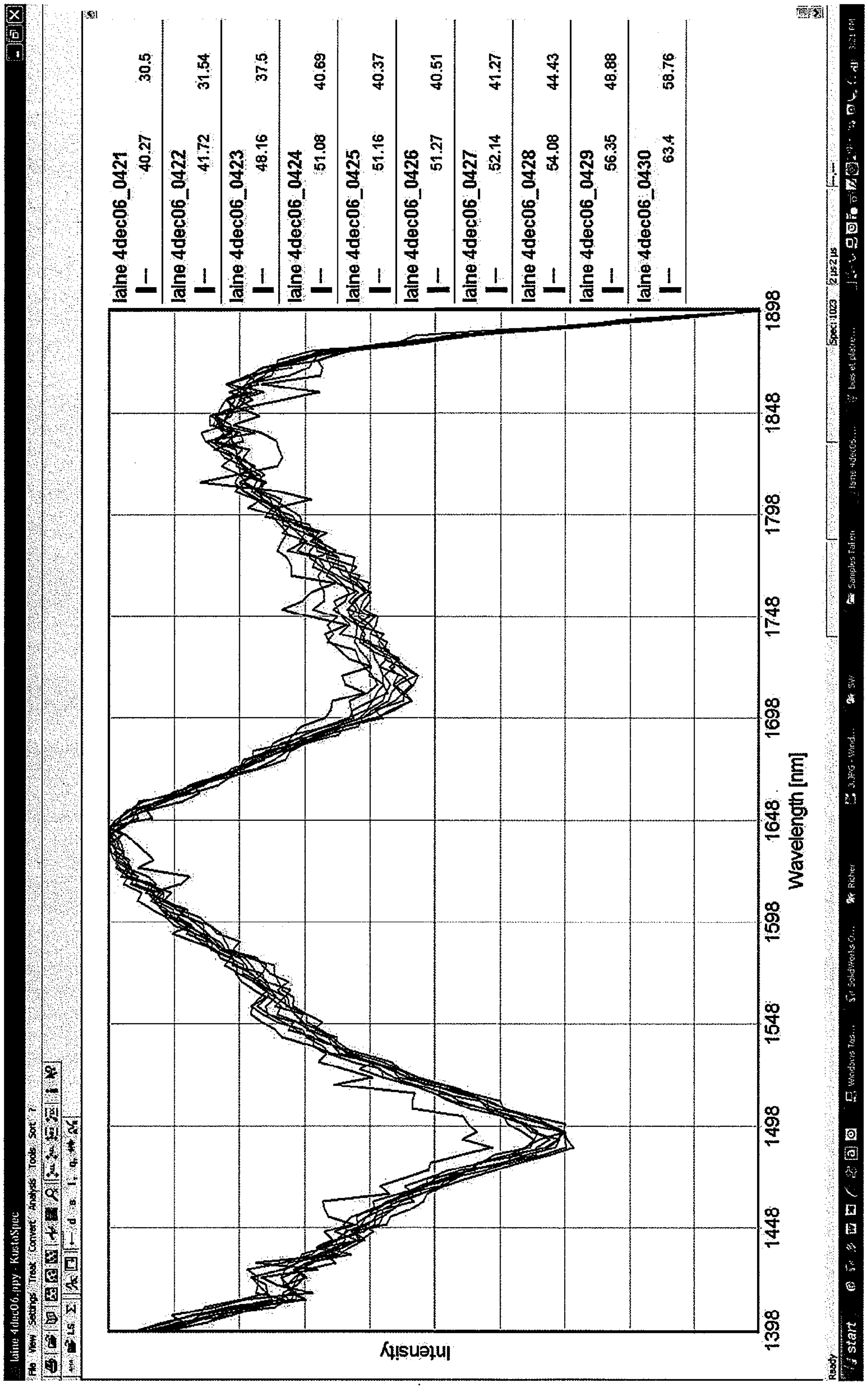
FIG. 20 is a graph of material being identified as wool and generated via spectral analysis with a system according to a preferred embodiment of the present invention.
Figure 21:
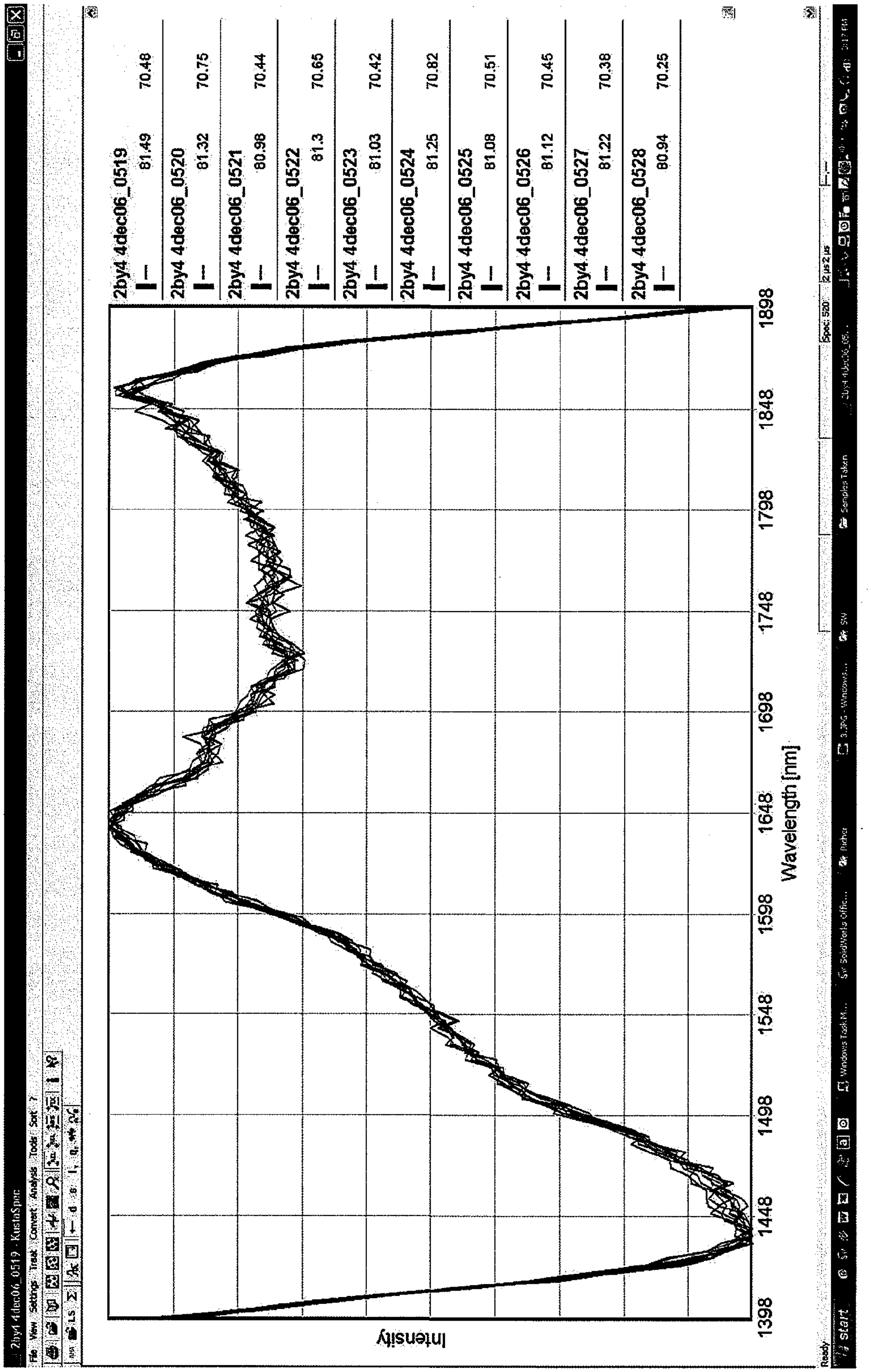
FIG. 21 is a graph of material being identified as a 2×4 and generated via spectral analysis with a system according to a preferred embodiment of the present invention
Figure 22:
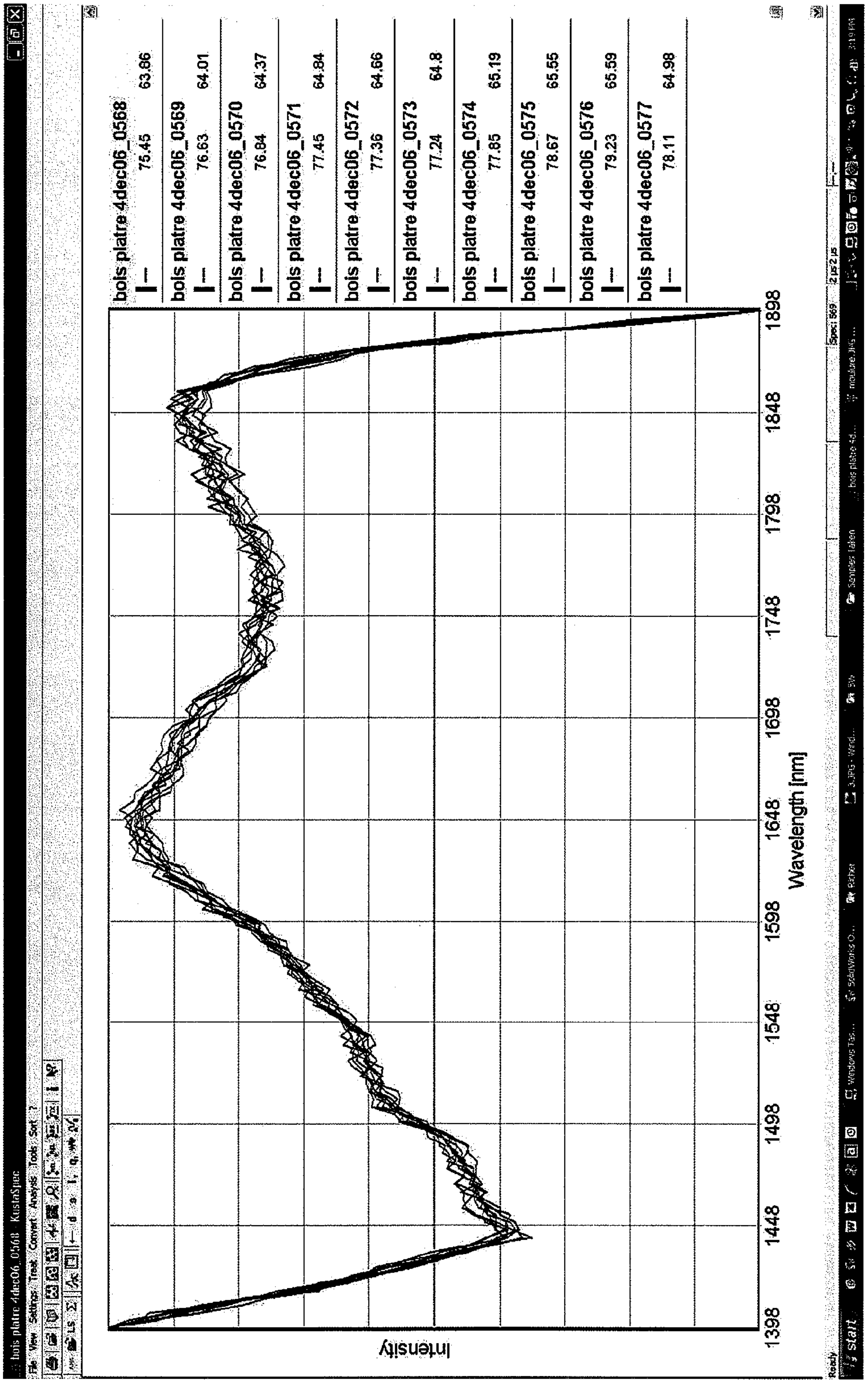
FIG. 22 is a graph of material being identified as wood with plaster and generated via spectral analysis with a system according to a preferred embodiment of the present invention.
Figure 23:
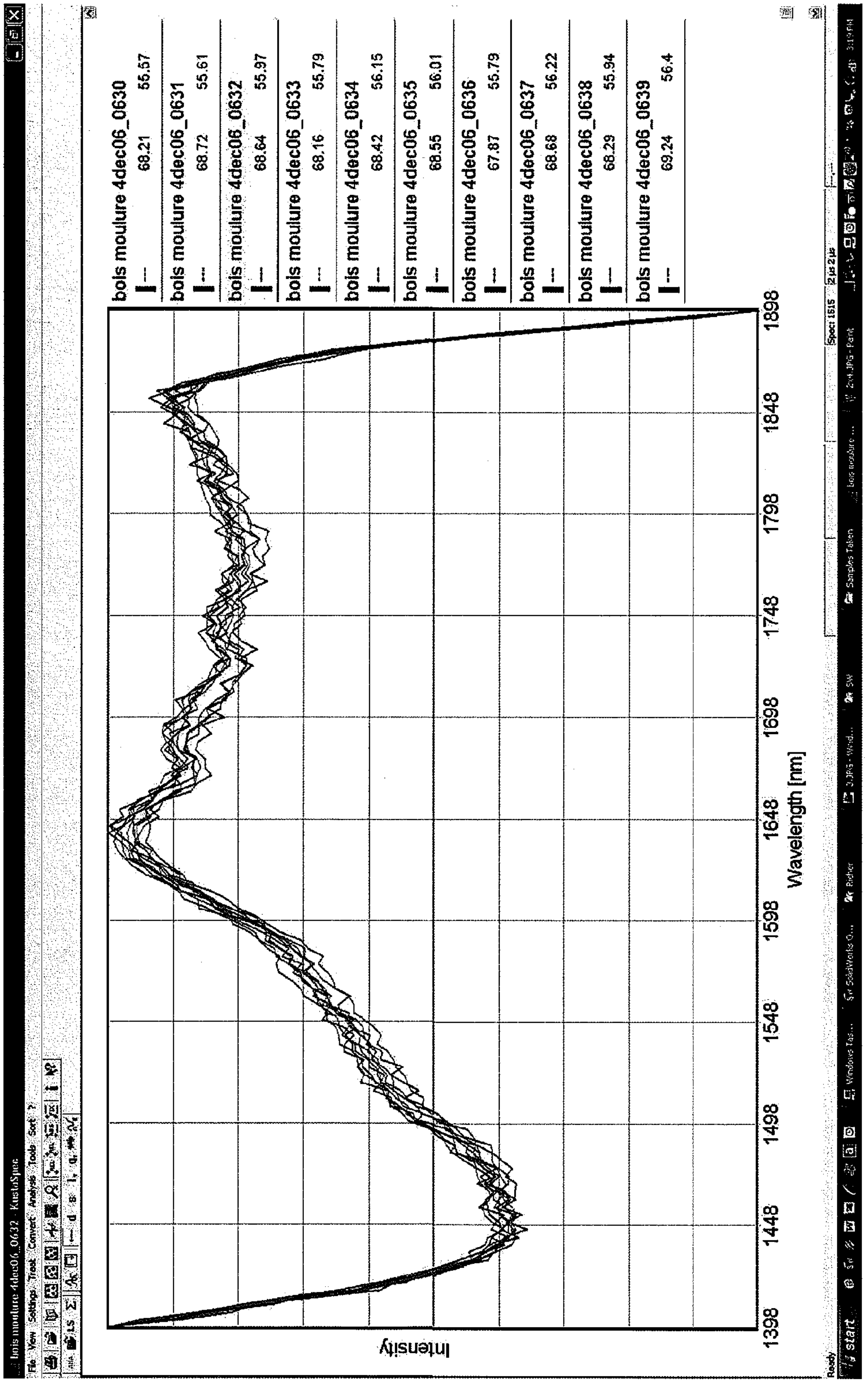
FIG. 23 is a graph of material being identified as a molding and generated via spectral analysis with a system according to a preferred embodiment of the present invention.
Figure 24:
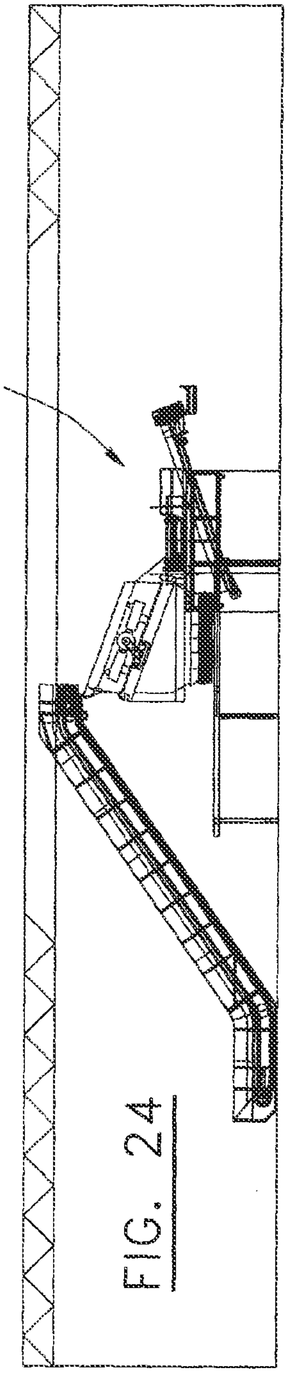
FIG. 24 is a side elevational view of a system according to yet another preferred embodiment of the present invention.
Figure 25:
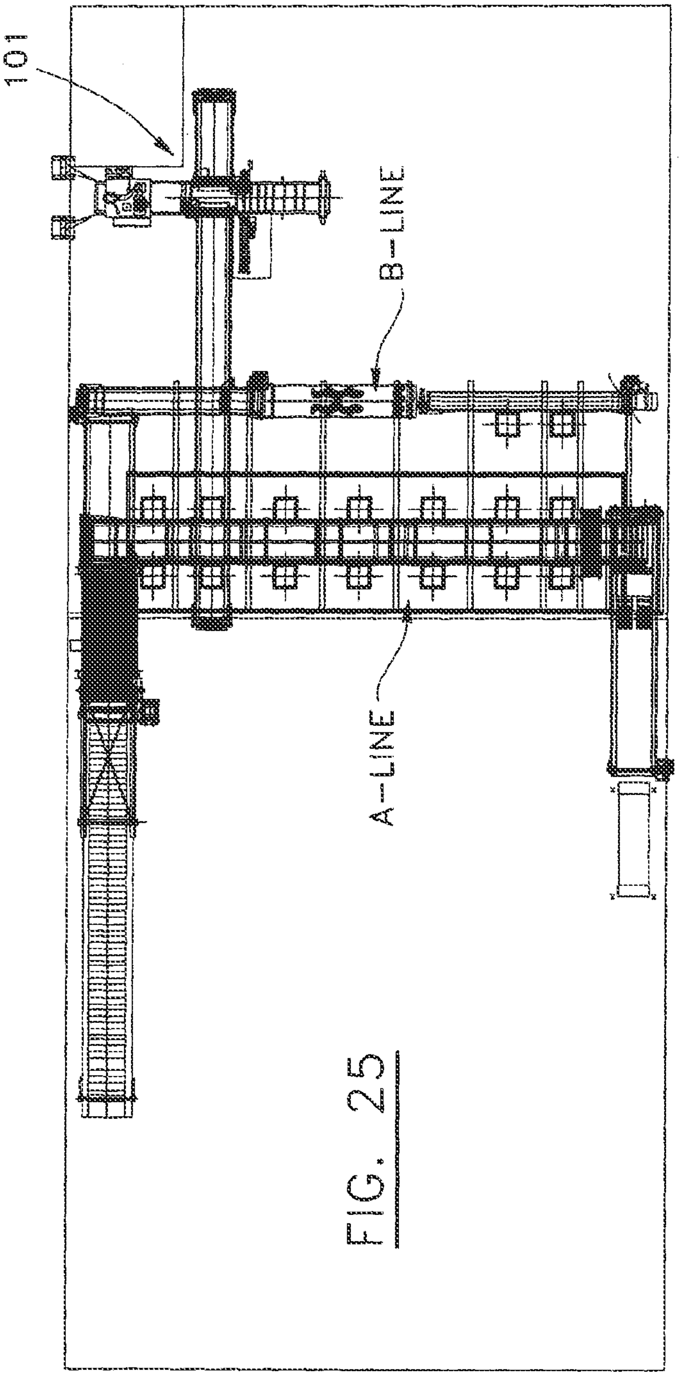
FIG. 25 is a top plan view of what is shown in FIG. 24, the system being shown with additional components operatively assembled thereto.
Figure 26:
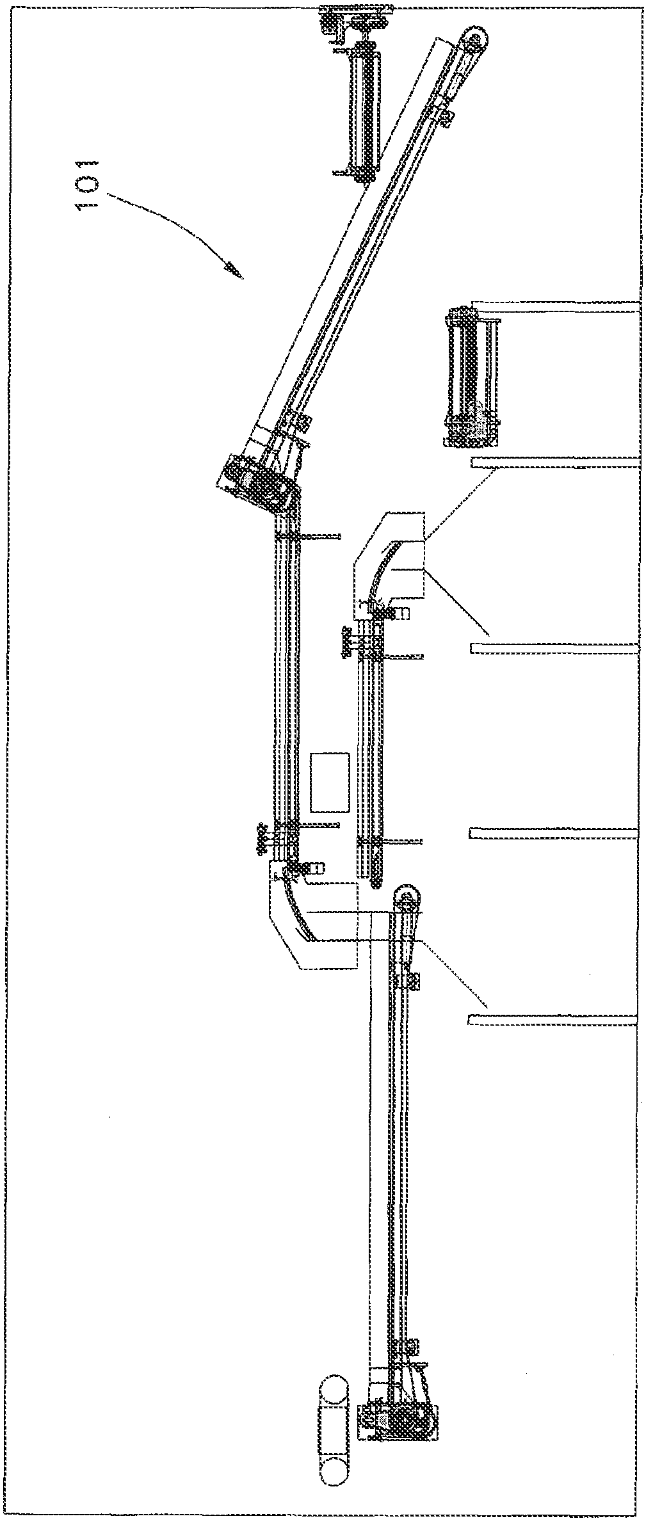
FIG. 26 is a schematic side elevational view of a system according to yet another preferred embodiment of the present invention.
Figure 27:
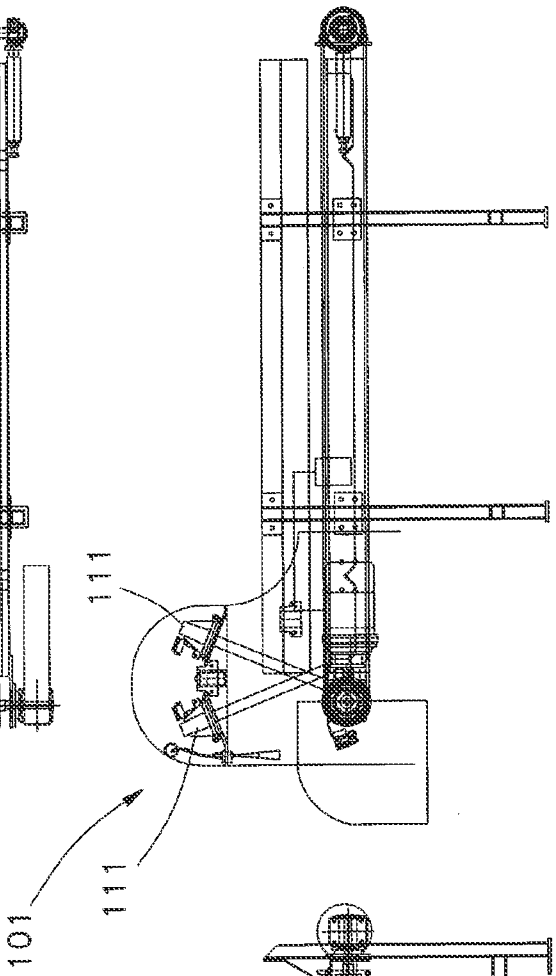
FIG. 27 is a schematic side elevational view of a sub-assembly of the system according to yet another preferred embodiment of the present invention.
Figure 28:
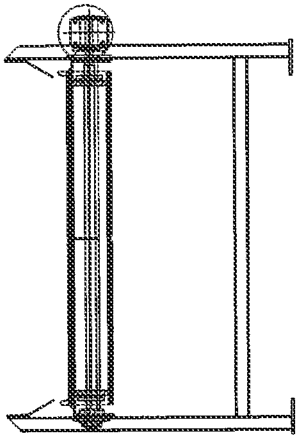
FIG. 28 is a front view of what is shown in FIG. 27.
Figure 29:
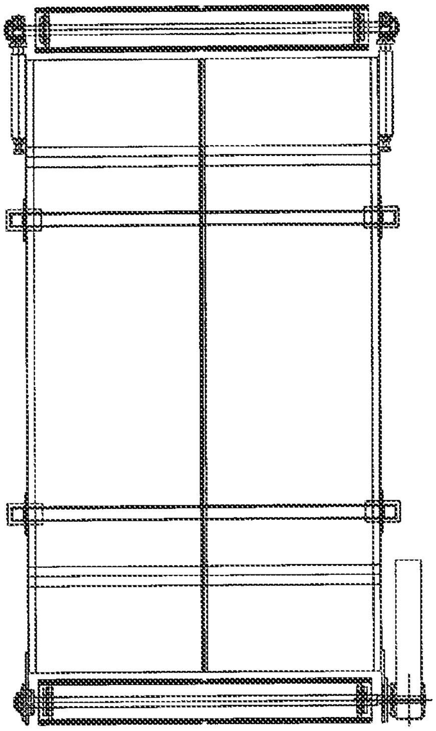
FIG. 29 is a top view of what is shown in FIG. 27.
Figures 30, 31, 32, 33A, 33B:
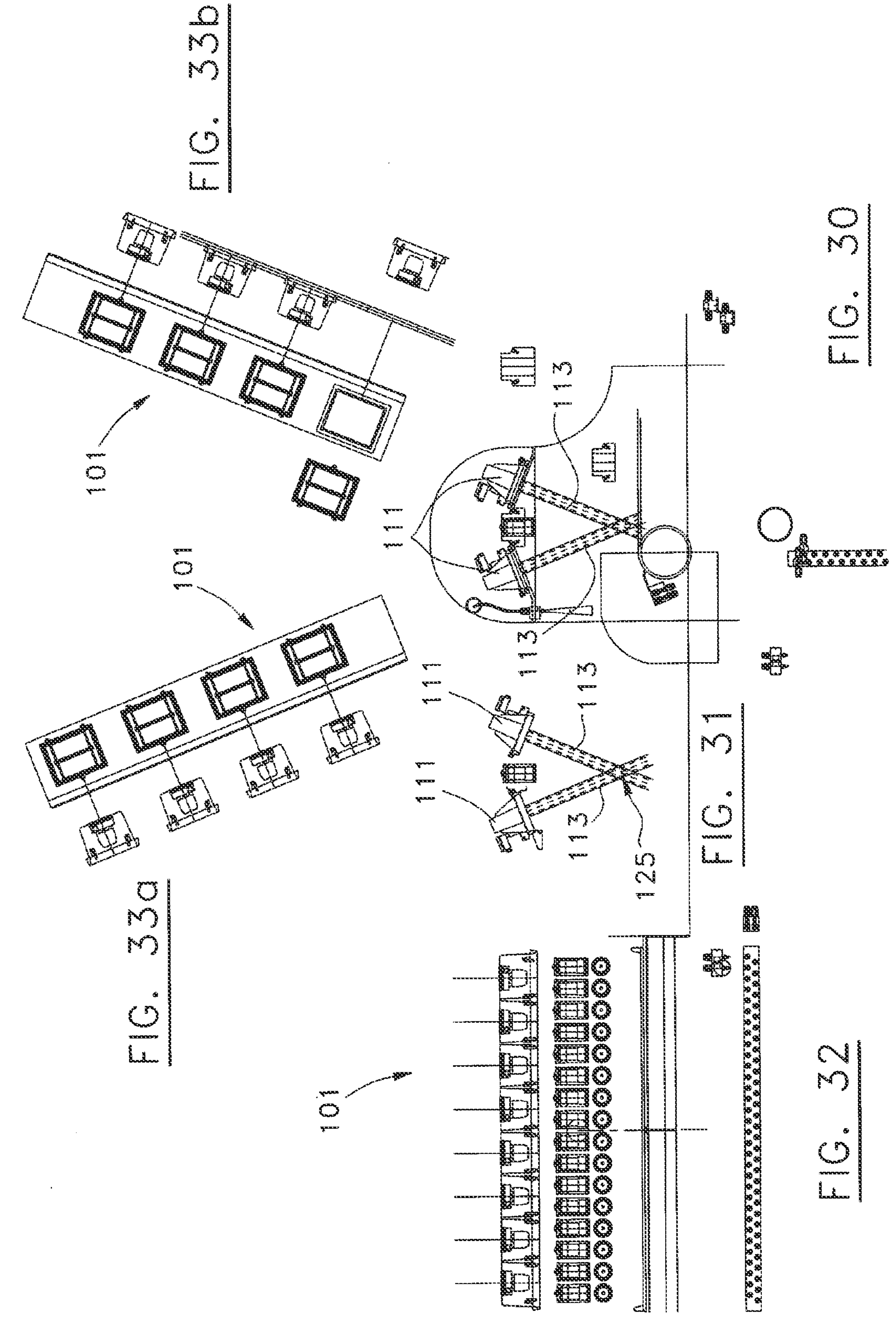
FIG. 30 is a schematic side elevational view of another sub-assembly of the system according to yet another preferred embodiment of the present invention.
FIG. 31 is a side view of some components shown in FIG. 30.
FIG. 32 is a partial top view of what is shown in FIG. 30.
FIGS. 33*a* and 33*b* are different partial top views of what is shown in FIG. 30.

As better illustrated in FIG. 18, the air jets 131 are provided with corresponding valves 139, preferably piston valves 139, operatively linked to the second processing unit 121 via proper wiring and/or the like so as to adjustably control the pressure of pressurized air propelled by the air jets 131 onto a given material to be sorted depending on the nature of said given material determined by the spectral analysis carried out by the first processing unit 119.

Figure 5:
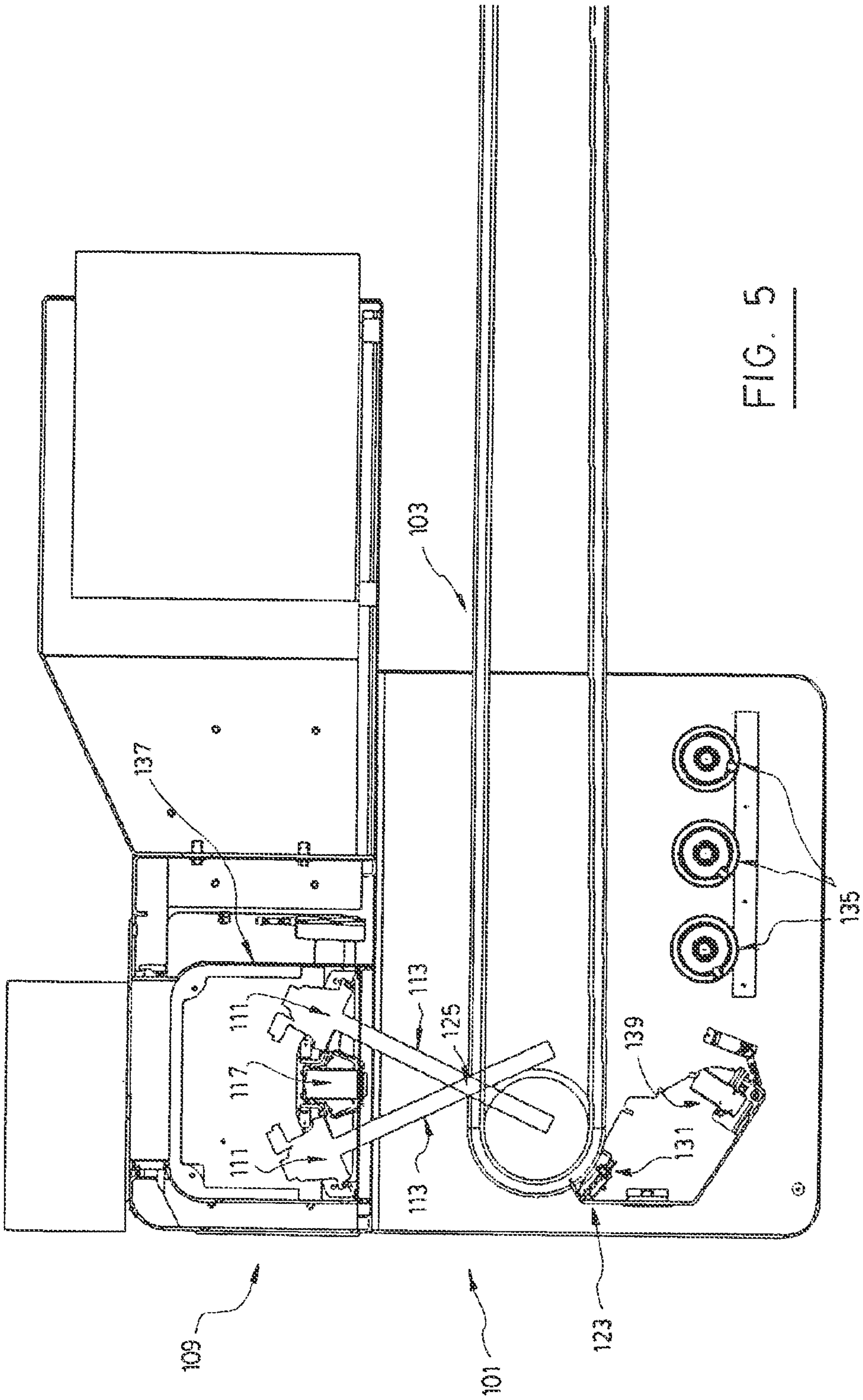
FIG. 5 is an enlarged view of a portion of what is shown in FIG. 4, a carriage of the identification unit being shown in a first configuration.
Figure 6:
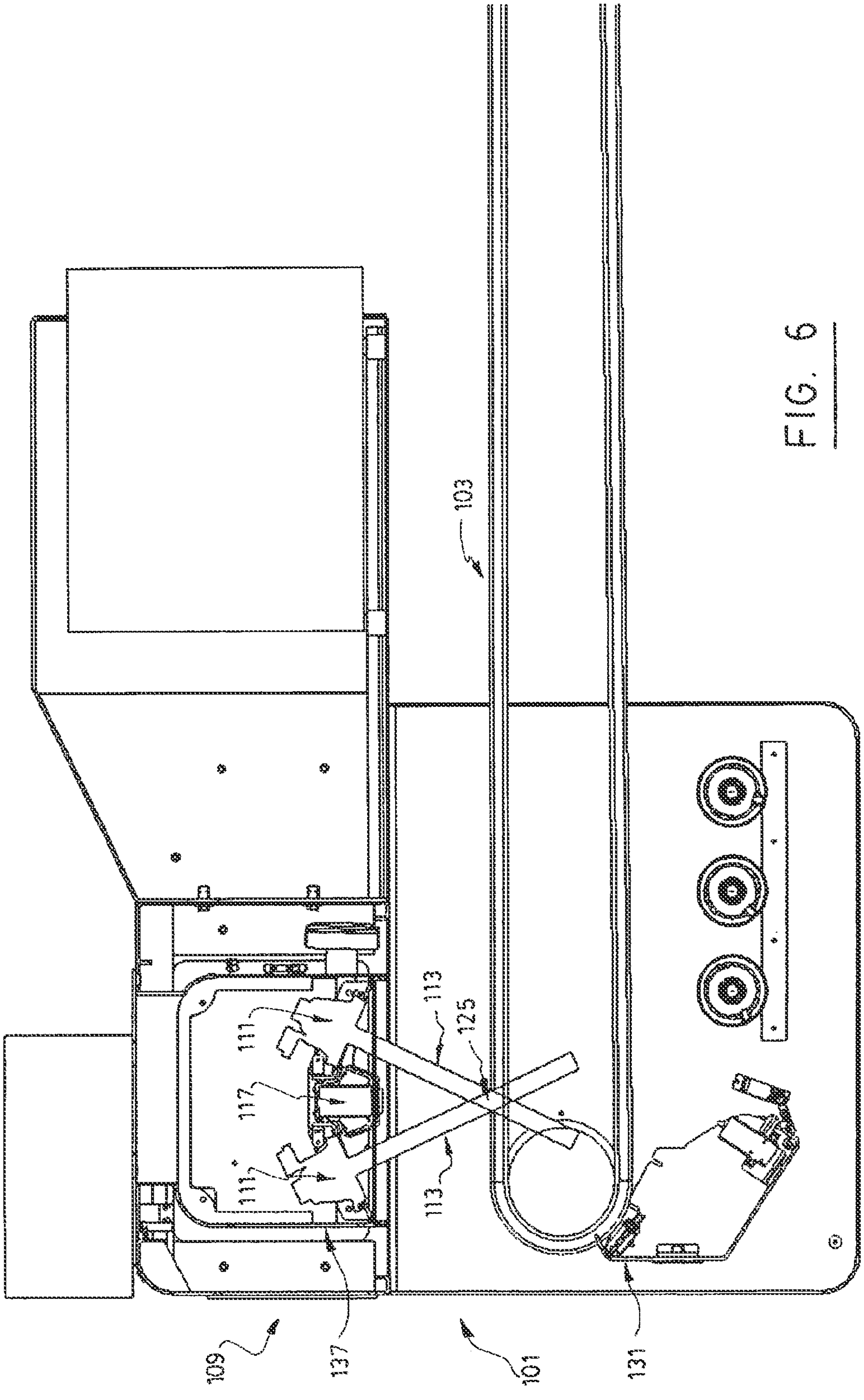
FIG. 6 is another view of what is shown in FIG. 5, the carriage being now shown displaced longitudinally and rearwardly with respect to the conveyor belt.
Figure 7:
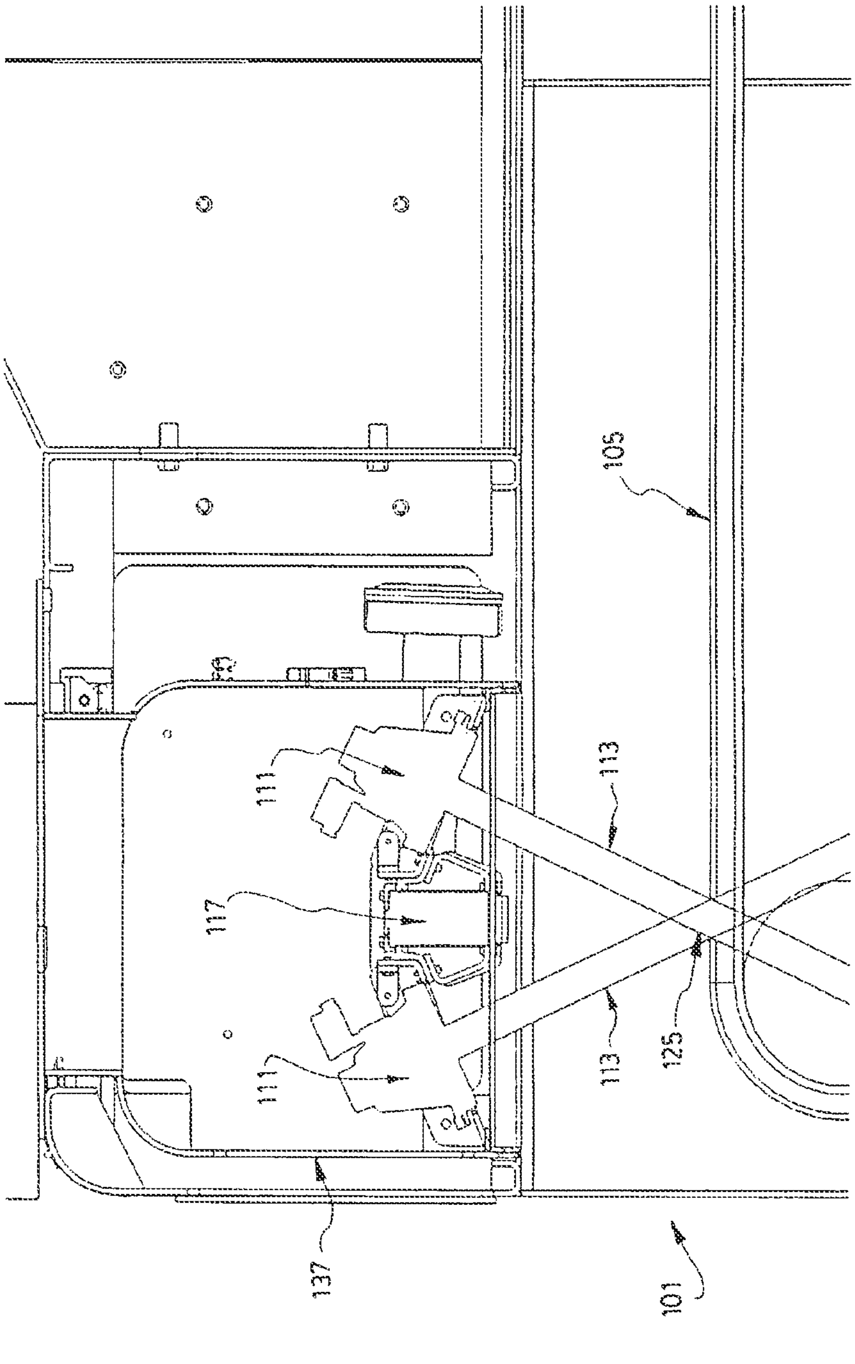
FIG. 7 is an enlarged view of a portion of what is shown in FIG. 6, the projectors being shown adjusted at a given angle.
Figure 8:
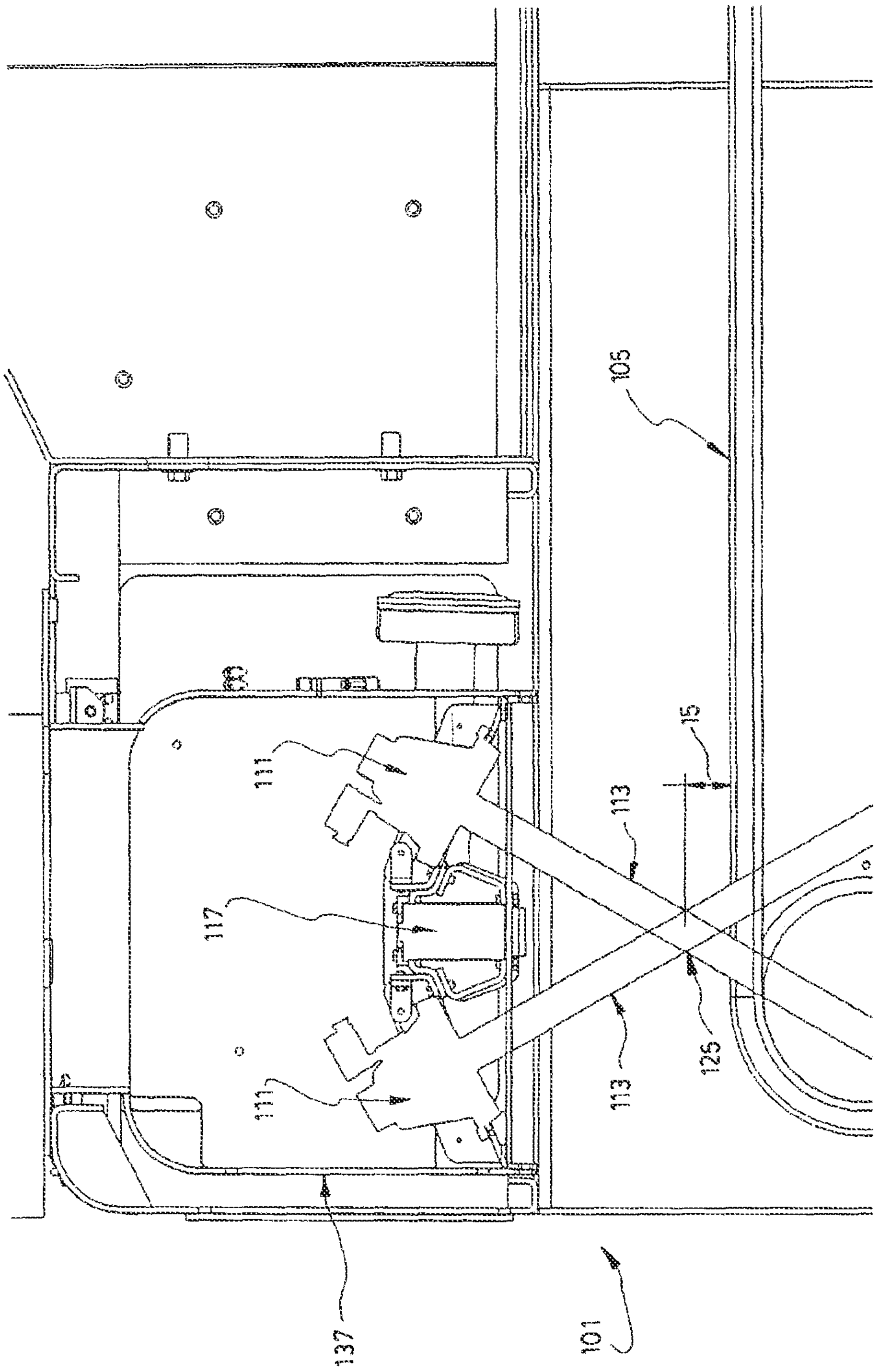
FIG. 8 is another view of what is shown in FIG. 7, the projectors being now shown adjusted at another given angle.
Figure 9:
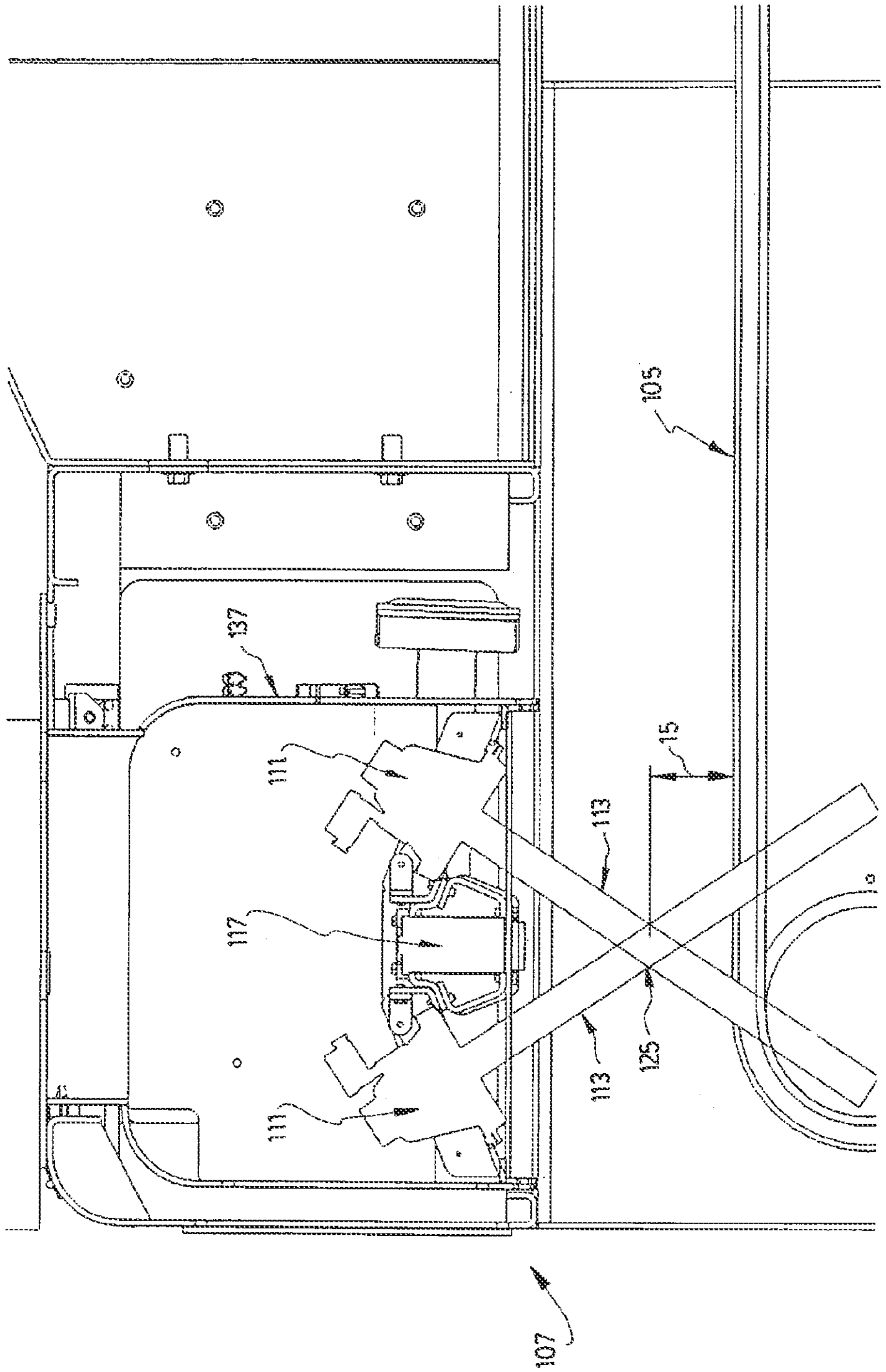
FIG. 9 is another view of what is shown in FIG. 8, the projectors being now shown adjusted at yet another given angle.
Figure 10:
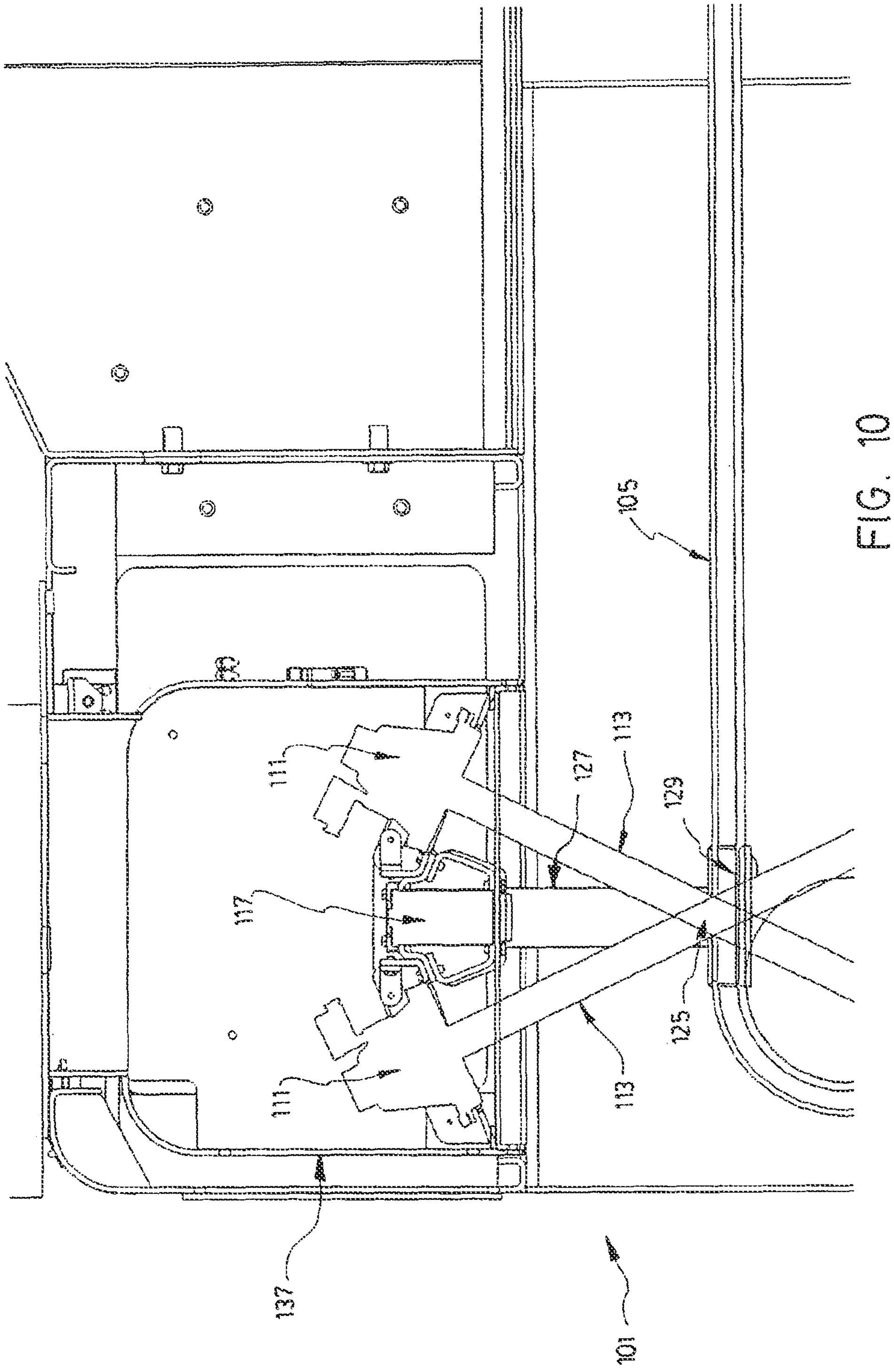
FIG. 10 is another view of what is shown in FIG. 7, the projectors being now shown cooperating with a calibration device according to a preferred embodiment of the present invention.
Figure 11:
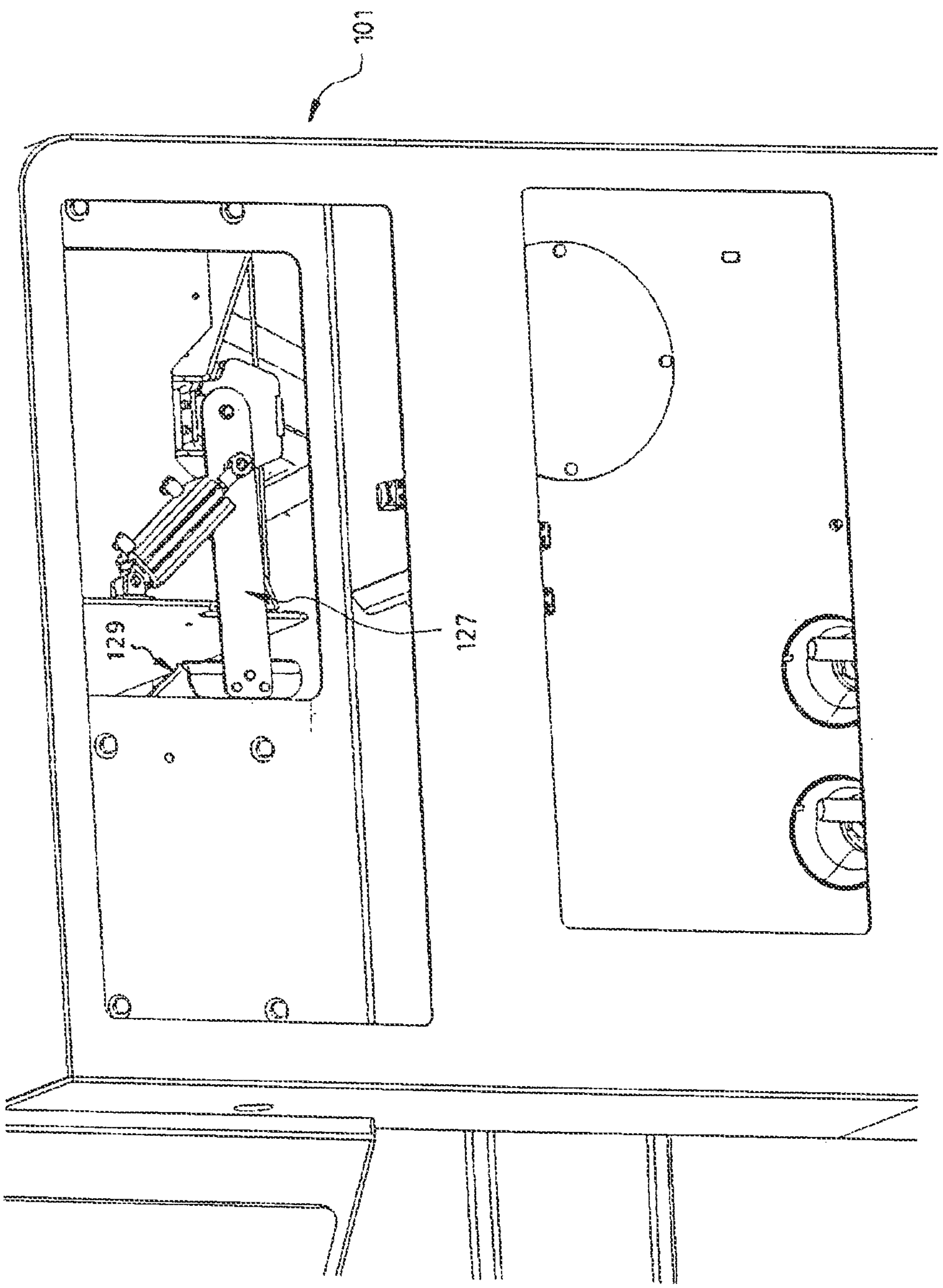
FIG. 11 is a partial side view of the system from an opposite side to that being shown in FIG. 10.

Preferably, each projector 111 and each lens 117 is mounted onto a corresponding carriage 137 of the identification unit 109 being displaceable longitudinally along the conveyor belt 103, as shown when contrasting FIGS. 5 and 6, and the positioning of the carriage 137 of the identification unit 9 along the conveyor belt 103 is adjusted according to type of material being sorted and time response of the air jets 131, as can be easily understood by a person skilled in the art.

Preferably also, each lens 117 is of circular form and acquires information on a diameter of about 2.5 inches; each projector is configured also to project a unidirectional beam of light 113; and is preferably a high-frequency halogen lamp, although other suitable sources of lights could be employed according to the present invention.

According to the preferred embodiment of the present invention, the first processing unit 119 comprises a multiplexer and each lens 117 transmits a signal through an optical fibre to said multiplexer. The first processing unit 121 preferably comprises a spectrometer and the multiplexer transmits an electrical signal from each lens 117 to the spectrometer. Each signal of each lens 117 is preferably transmitted to the spectrometer at a rate of about 70 Hz.

The second processing unit 121 preferably comprises a database of curves representative of a variety different materials and constructed via software from the each electrical signal received from each lens having received reflected light from a given material.

According to a preferred embodiment of the present system, the beam of light 113 projected from the at least one projector 111 covers an area of about 48 inches long by about 103 inches wide, and concentrates about 4 KWatts of lighting, power The system 101 also preferably comprises chutes for receiving material having been sorted and released from the second end 103*b* of the conveyor belt 103.

LIST OF OTHER REFERENCE NUMBERS USED FOR PREFERRED COMPONENTS ILLUSTRATED IN THE ACCOMPANYING DRAWINGS

1. apron
2. overhead drive finger screen 6' (c/w existing structure)
3. stargear
4. slider bed 6'×25'-3" (cleated) c/w support
5. slider bed 3'×26' (cleated) (3'×70') c/w support
6. near optical sorting (5 products) c/w 2 conveyor (19'-9" & 14'-3") and supports
7. slider bed 2'×27'-9" c/w support
8. slider bed 2'×13' (3'×22') c/w support
9. slider bed 4'×51' (6' large) c/w support
10. slider bed 55'×12' c/w support
11. baler
12. crusher
13. conveyor c/w support
14. trommel
15. overhead magnet 24'
16. wall 12'×9' (6 plated 1 side)
17. baler QC platform 60 sq. ft.

Broadly described, the sorting system 101 according to the present invention, as exemplified in the accompanying drawings, is an automatic sorting system 101 comprising equipment that can distinguish and separate various materials, such as non-homogeneous materials, for example. The equipment preferably takes continuous readings in the spectral resolution of the Near Infra Red (NIR). Through analysing the reflection of light by the respective materials a distinctive curve can be recorded for each type, preferably in spite of the fact that the wave length is not similar, as can be easily understood by a person skilled in the art. Based on these curves, it is possible to build families of curves that can be associated to respective material types, given a margin for error that is adjustable according to the desired precision, as illustrated in FIGS. 19-23 for example.

It is important to note that, preferably, the readings are continuously done through a lens 117 (or group of lenses 117) situated above the conveyor belt 103 that is running at a speed of about 0-600 ft/min. The system 101 preferably consists of one or many lenses 117 that are in a circular form, that acquire information on a diameter of approximately 2.5 inches. The sizes of the lenses 117 may be of different diameters to meet a specific need, as can be easily understood by a person skilled in the art. Preferably, these lenses 117 are normally situated on the same axis and at the same height above the belt 103.

Preferably also, each lens 117 transmits the optical signal through an optical fibre to a multiplexer that redirects the light signal (or optical signal) to a spectrometer that converts the light signal into an electrical one. It is important to note that the multiplexer can transmit the signal from each individual lens 117 to the spectrometer at a rate of up to about 70 Hz. The speed of the spectrometer can be adjusted to meet different objectives whether it is to go faster to increase throughput of the readings or slower to increase exposure time of the material to improve the quality of the reading, as can be easily understood by a person skilled in the art.

According to the present invention, and to obtain appropriate readings, the system 101 constructs curves that are representative of the material passing by. Thus. It is recommended to use one or more lights to saturate the reading area with lighting. Presently and preferably, the system employs a lighting scheme that will concentrate about 4 kWatts of lighting on an area of about 48 inches long and about 3 inches wide. The lighting scheme transmits the light in such a way, and the lenses are configured to be adjusted in angle, such that a resulting processing area (i.e. exposure to light from the projectors) covers a range of heights 115 above the conveying surface 105 of the belt 103, and is thus not necessarily limited to said conveying surface 105.

One of the significant characteristics of the system 101 is that it is designed to "learn". Briefly explained, whenever it is desired to sort a new product and that this product is not part of the existing library of the system 101, it is possible to create a new library that will consist of the existing library and the new material. By switching the system 101 to the learn mode, it is possible to present a new product to the lens (1) and then the system 101 will record the new curve, from which a new algorithm may be constructed to sort this new product. In this process several readings of the same type of material have to be done to create a typical curve and algorithm, such as the ones exemplified in FIGS. 19-23. Once these steps are properly done, it is ready for the user of the system 101 to incorporate a new product to his sorting system 101.

The preferred functionality of the present system 101 is briefly summarized as follows: once the lens 117 has received the light signal and that the spectrometer has transformed it into an electrical one, the computer will create the curve and identify it according to the library it is using. Once the identification is done, the computer sends a string of information to an industrial personal computer (PC) or powerline communication (PLC) that will sort according to the users requirement(s). The user can then choose what type of material is to be sorted out and where it is going to go—this is done preferably according to the places available. The desired material (product) will be ejected to the desired location by simply diverting (i.e. redirecting) it from its normal course (trajectory) in mid-air when released by the conveyor belt 103 via suitable means (e.g. nozzles or air jets 131), as for the material not desired, it will proceed unaffected in its course. Air jets 131 are preferably situated at the head of the conveyor 103 at the point where the material falls off into mid-air. The configuration of the air jets 131 is such that one or many rows of air jets 131 may be installed depending on the force necessary to eject the desired material. Furthermore, the extremities of the air jets 131 are preferably tapered so as to increase thrust of air coming out of said air jets 131. Another option that the user has is to sort-out more than one material at the same time. The chute at the head of the conveyor 103 is normally built with dividers which permit the sorting of several materials, and/or several types of material, in the desired locations.

The first series of air jets 131 is normally situated at proximity of the quadrant of the head pulley. This series of air jets 131 can be multiple and are preferably configured to eject the desired materials in an upward direction towards a chute or a different conveyor 103 while keeping the same forward trajectory. A second set of air jets 131 can be situated above the quadrant of the head pulley at a distance which can vary by about 4 inches to a height of approximately 16 inches above the belt 103. This set of air jets 131 would preferably eject the material in a downward direction, although material could be sorted and re-directed in other suitable manners, as can be easily understood by a person skilled in the art.

It is important to note that the types of materials fed to the system 101 are not important, the programming of the equipment will be done in such a way that the user will have the freedom to select the desired product and to send it to the chute. At this point in time, several types of conventional automatic sorting systems have been constructed, however they are all for the same group of products. Since the spectrometer of the present innovative system 101 is designed to take readings on the complete spectral range of the NIR, it is possible for a user to construct several libraries of products without changing the functionality or constitution of the equipment. Moreover, some families of products have similar light reflection patterns, however the present system 101 permits the use of advance algorithms, i.e. more than a single derivative for example, that will permit to differentiate between more subtle differences in some types of materials. An example of such differences are wood, cardboard and paper, they have the same spectral response after a first derivative which does not permit to differentiate between them, however after further algorithm, such as a second derivative, it is possible to distinguish between them, as can be easily understood by a person skilled in the art when referring to FIGS. 19-23. The same type of analysis can be applied to different materials with similar light response such as plastics 1 to 7, as well as variations in the curves due to additives in the plastics, as can be easily understood by a person skilled in the art.

It is important to note that for plastics, the spectral (or spectrographic) response of the present system 101 enables through several algorithmic steps to distinguish between the same type of material but with coloration versus natural colour of the plastic. This option eliminates the need of a colour or a black-and-white camera to be added to the system, as is required with conventional systems.

Furthermore, the spectrometer of the present invention is designed to enable to take readings with up to about 64 lenses 117 preferably, these lenses 117 can then be separated into several groups. Each group may consist of about 1 to 64 lenses, and each of these groups can then be made to sort different types of materials. The flexibility of the equipment permits, however unlikely, the possibility of creating about 64 independent zones that could sort different products upward, downward and through unchanged. An example of such a system would be one conveyor belt 103, this belt could be divided across the length of it into as many sections as desired as long as the sections are large enough for one lens' diameter. It is to be noted that in practical terms, it may be hard to subdivide a conveyor belt 103 into many sections, therefore the present invention is designed to enable the use of several conveyors 103 without having to add a new spectrometer. However, the radius from which the lenses 117 can be placed away from the spectrometer without affecting the speed of the system 101 is approximately 15 meters, longer lengths may require adjustments in the conveyor belt speeds. Having said so, it would be possible to use two conveyors in a cascaded manner with the same spectrometer in a linear or perpendicular manner (or other) in respect to one another or simply take two or more conveyors 103 superposed and opposite in direction with the lenses 117 located at the two head pulleys with there own sets of air jets 131 for sorting the different materials. The number of possibilities are endless as long as some rules of implementations are respected, as can also be easily understood by a person skilled in the art.

As described above, it is important to consider the trying to specifically detail the possibilities, versatilities and the details strengths of the equipment. Now, another aspect of the present invention, namely the process and method in which the sorting and/or identifying is carried out will be briefly described. Indeed, the application can be used in the context of the recycling of curb side trash, curb side recycling materials, commercial waste or simply in the context of a C&D (construction and demolition) or any other implication where the system 101 can identify specific curves.

For practical uses, and according to a preferred embodiment as described herein for exemplification purposes only in the context of the present application, concentration will be made on the C&D in attempts to be as descriptive as possible. Basically, C&D trash is primarily composed of: wood, aggregates, plastics, shingles, granular materials of ⅜" and less, cardboard; ferrous and nonferrous materials, etc. The granulated materials vary largely in composition and in density. To sort the materials more appropriately, it is necessary to proceed in the first stage with a volumetric sort. The first sort is done by loading the materials directly unto a vibrating screen or loading the materials unto a conveyor that feed the screen.

The vibrating screen will sort out all the materials superior in size to the capacity that the automatic optical sorting air jets can handle. The typical sizes accepted by the optical sorting machine are in the range of about 2 to about 10 inches, these are approximated sizes. For practical uses, the materials that are more volumetric than the first cut will be defined as the A-line and the materials that were small enough to pass through the screen as the B-line. The B-line is the line that will be fed to the optical sorting machine.

In order to improve the efficiency of the optical sorting machine, it is possible to use a vibrating or rotating screen prior to the machine to eliminate all granular and volumetrically speaking small pieces out of the stream. Once the granular material has been taken out, a magnetic conveyor or magnetic pulley is preferably used to remove all ferrous material out of the stream. At this point, two options are preferably available to perform an optical sort or to remove all nonferrous and aggregates. If the removal of the aggregates is the desired step, a sort based on density could be done by the use of a de-stoner or simply by manual sorters, for example. However, and although not necessary, the density sort is highly recommended to improve the efficiency and quality of the optical sorting machine.

Following the same sequence of event, one can install the optical sorting machine after the de-stoner and this one would sort the materials remaining to remove the desired products according to clients' needs and markets. The possibilities could be, for example: clean wood, treated wood, pressed wood, other varieties of wood products, paper, cardboard, plastics of any type or simply what material a user (i.e. client) has added to his library.

The installation of an optical sorting machine increases efficiency as well as the percentage of material that can be recovered while reducing the manpower normally necessary to reach such results. In order to obtain a superior product quality, a visual quality control section should be installed at the end of the process to ensure that the end products are as pure as possible if the materials' market require such quality. Furthermore, the installation of an optical sorting is the only way to remove such wood products with additives, like arsenic, copper, etc., which is called "contamination".

In counterpart to what was mentioned above, if the material is too volumetric prior to the density sort phase, it would be recommended to use the optical sorting machine prior to the de-stoner to improve the quality of the density sort, as can be easily understood by a person skilled in the art. The optical sorting machine would reduce the volume of material entering that phase and hence the quality of the aggregates would be superior and less would be lost. Whether the user requires the system with optical sorting prior or post the density sort phase is solely at the discretion of the user, both approaches have their advantages and disadvantages, as can also be easily understood by a person skilled in the art. The users' need will dictate which approach will be more profitable for his market.

The application (process) described above could be applied to any type of material that is non homogeneous where paper could be mixed with glass, plastic as well as ferrous materials (single stream) or whatever application or combination of materials that could be recognized with the help of a spectrometer.

According to other aspects of the present invention, there is also provided a method for operating the above-mentioned system 101; a method of identifying at least one material with the above-mentioned system 101; a kit for assembling the above-mentioned system 101; a method for assembling components of the above-mentioned kit; a method of manufacturing the above-mentioned system 101; at least one material having been sorted with the above-mentioned system 101 and/or method; and at least one material having been identified with the above-mentioned system 101 and/or method, as exemplified and as can be easily understood by a person skilled in the art when referring to FIGS. 24-33 of the present application.

Moreover, according to the present invention, the sorting system 101 and corresponding parts are preferably made of substantially rigid materials, such as polymeric materials (plastic, rubber, etc.), hardened polymers, composite materials, metallic materials, and/or the like, in order to achieve the resulting advantages briefly discussed herein, depending on the particular applications for which the system 101 is intended for and the different parameters in cause (gripping capabilities desired; sorting capabilities; nature of materials being sorted; resistant to wear and tear, impact resistant, rate of output, etc.), as apparent to a person skilled in the art.

As being now better appreciated, the present invention is an improvement and presents several advantages over other related devices and/or methods known in the prior art. Indeed, the present invention is particularly advantageous in that it enables to specifically identify materials going through a product stream, and to sort them accordingly, in a precise manner, and/or at a high output rate. Indeed, as explained hereinabove, the present system 101, via its corresponding library of curves and other components of the system 101, enables to specifically and precisely identify the nature or color of the materials being sorted with the system. Furthermore, as briefly explained herein, it is also designed to have a variety of configurations so as to carry out various different types of sorting applications, while enabling to reduce assembling, operating, maintenance and/or repair cost associated with the operation of the system, while still enabling a very high degree of sorting capability. Moreover, the present invention is also advantageous in that, as explained hereinabove, it can work simultaneously or not, and thus with a multitude of products, or there can or cannot be similar with wave lengths completely different. In addition, it can identify clear or colored materials just with the analysis or the intensity independently to the material HDPE clear or colored, PET clear or colored, etc.

Of course, numerous modifications could be made to the above-described embodiments without departing from the scope of the invention, as defined in the appended claims.

The invention claimed is:

1. An automatic sorting system for identifying and sorting non-homogenous material, the system comprising:

a conveyor belt having a conveying surface traveling along a longitudinal direction for conveying bulk material to be identified and sorted, the conveyor belt having a first end for receiving said bulk material and a second end for releasing sorted material;

an identification unit cooperable with the conveyor belt and placed above the conveying surface thereof for identifying material traveling therealong, the identification unit comprising:

at least one pair of projectors, each of the projectors being configured for projecting a beam of light downwardly towards the conveying surface so as to define an intersecting area of light, at a given height above said conveying surface, and onto a given material to be identified, so that a portion of projected light may be reflected back from said given material and upwardly towards the identification unit;

at least one lens positioned about the identification unit for receiving said portion of reflected light from the given material to be identified;

a first processing unit operatively linked to the at least one lens for carrying a spectral analysis of the portion of reflected light captured by the at least one lens so as to determine the nature of the given material; and a second processing unit operatively linked to the first processing unit for comparing results of said spectral analysis with corresponding data associated to a variety of different materials stored in a given database of the second processing unit; and a sorting unit operatively linked to the second processing unit and operatively cooperating with the second end of the conveyor belt so as to sort material released from said second end of the conveyor belt depending on signals received from the second processing unit.

2. A system according to claim 1, wherein the sorting unit comprises at least one air jet for propelling pressurized air onto given material identified by the identification unit and released from the second end of the conveyor belt so as to redirect said given material into a corresponding receiving device configured for receiving said sorted given material.

3. A system according to claim 2, wherein the air jets are provided with corresponding valves operatively linked to the second processing unit so as to adjustably control the pressure of pressurized air propelled by the air jets onto a given material to be sorted depending on the nature of said given material determined by the spectral analysis carried out by the first processing unit.

4. A system according to claim 1, wherein each lens is of circular form and acquires information on a diameter of about 2.5 inches.

5. A system according to claim 1, wherein each of the projectors is configured to project a unidirectional beam of light.

6. A system according to claim 1, wherein each of the projectors is a high-frequency halogen lamp.

7. A system according to claim 1, wherein the first processing unit comprises a multiplexer and wherein each lens transmits an optical signal through an optical fibre to said multiplexer.

8. A system according to claim 1, wherein each signal of each lens is transmitted to the spectrometer at a rate of about 70 Hz.

9. A system according to claim 1, wherein the second processing unit comprises a database of curves representative of a variety different materials and constructed via software from the each electrical signal received from each lens having received reflected light from a given material.

10. A system according to claim 1, wherein the beam of light projected from the at least one projector covers an area of about 48 inches long by about 3 inches wide, and concentrates about 4 KWatts of lighting.

11. A system according to claim 1, wherein the sorting unit diverts desired material from its trajectory.

12. A system according to claim 1, wherein the system comprises a de-stoner to perform a density based sort of the material prior to or after the conveyor belt.

13. A system according to claim 1, wherein the system comprises a magnetic conveyor or a magnetic pulley used to remove ferrous materials from the stream of traveling material.

14. A system according to claim 1, wherein the system comprises a volumetric sorter to perform a volumetric sort of the material prior to the material being deposited on the first end of the conveyor belt.

15. A system according to claim 14, wherein the volumetric sorter is selected from a group comprising vibrating screens and rotating screens.

16. A system according to claim 1, wherein the identification unit is configured to take continuous readings in the spectral resolution of the Near Infra Red (NIR).

17. A system according to claim 16, wherein the system comprises chutes for receiving material having been sorted and released from the second end of the conveyor belt.

18. A system according to claim 1, wherein the at least one pair of projectors comprises first and second rows of projectors, each row of projectors extending substantially in a traverse relationship with respect to the longitudinal direction of the conveyor belt, the first row of projectors projecting a series of light beams intersecting with a series of light beams projected from the second row of projectors so define an intersecting area of light at a given height above the conveying surface of the conveyor belt, and onto a given material to be identified traveling along said conveyor belt, so that a portion of reflected light from the intersecting area of light may be reflected back from said given material and upwardly towards the identification unit.

19. A system according to claim 18, wherein the rows of projectors are adjustable in angle with respect to the identification unit so that the intersecting area of light may be adjustable in terms of height with respect to the conveying surface of the conveyor belt.

20. A system according to claim 18, wherein the at least one lens comprises a row of lenses provided between the first and second rows of projectors.

21. A system according to claim 1, wherein the identification unit comprises a calibration device having a calibrating surface removably positionable below the at least one projector so that a portion of reflected light may be reflected back from the calibration surface and upwardly towards the at least one lens so as to calibrate the identification unit.

22. A system according to claim 21, wherein the calibration surface comprises white ceramics.

23. A system according to claim 2, wherein the sorting unit comprises at least one source of pressurized air for feeding the air jets with corresponding tubes.

24. A system according to claim 2, wherein the at least one air jet comprises a series of air jets extending along the sorting unit, substantially in a traverse relationship with respect to the longitudinal direction of the conveyor belt.

25. A system according to claim 24, wherein the air jets are adjustable in angle with respect to the sorting unit.

26. A system according to claim 25, wherein the sorting unit comprises a compartment being operable between open and closed configurations, the air jets being removably mounted onto said compartment.

27. A system according to claim 2, wherein each projector and each lens is mounted onto a corresponding carriage of the identification unit being displaceable longitudinally along the conveyor belt.

28. A system according to claim 27, wherein the positioning of the carriage of the identification unit along the conveyor belt is adjusted according to type of material being sorted and time response of the air jets.

29. A system according to claim 1, wherein the first processing unit comprises a spectrometer and wherein the multiplexer transmits a signal from each lens to the spectrometer.

30. A system according to claim 29, wherein the spectrometer is used with a plurality of the systems sorting different materials on independent conveying belts.

31. A system according to claim 29, wherein a second the system is placed at the second end of the conveyor belt of the system for further sorting of the material, with both systems using the same spectrometer.

* * * * *